United States Patent
Qiu

(10) Patent No.: US 11,892,299 B2
(45) Date of Patent: Feb. 6, 2024

(54) INFORMATION PROMPT METHOD AND ELECTRONIC DEVICE

(71) Applicant: Huawei Technologies Co., Ltd., Shenzhen (CN)

(72) Inventor: Zeling Qiu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 486 days.

(21) Appl. No.: 17/281,181

(22) PCT Filed: Sep. 30, 2018

(86) PCT No.: PCT/CN2018/109159
§ 371 (c)(1),
(2) Date: Mar. 29, 2021

(87) PCT Pub. No.: WO2020/062267
PCT Pub. Date: Apr. 2, 2020

(65) Prior Publication Data
US 2021/0397839 A1    Dec. 23, 2021

(51) Int. Cl.
*G01C 21/20* (2006.01)
*G06T 7/73* (2017.01)
(Continued)

(52) U.S. Cl.
CPC ............ *G01C 21/206* (2013.01); *G06T 7/73* (2017.01); *G06T 15/06* (2013.01); *G06T 15/506* (2013.01);
(Continued)

(58) Field of Classification Search
CPC ............... G06F 3/4817; G06F 3/0482; H04M 1/72445; H04M 1/42469
See application file for complete search history.

(56) References Cited

U.S. PATENT DOCUMENTS 7,043,474 B2 * 5/2006 Mojsilovic ............ G16H 30/40
7,519,573 B2 * 4/2009 Helfman ............... G06F 16/958
(Continued)

FOREIGN PATENT DOCUMENTS

CN    103971589 A    8/2014
CN    104102678 A    10/2014
(Continued)

OTHER PUBLICATIONS

ITU-T H.264, "Series H: Audiovisual and Multimedia Systems, Infrastructure of audiovisual services—Coding of moving video, Advanced video coding for generic audiovisual services," Apr. 2017, 812 pages.

*Primary Examiner* — Yosef Kassa
(74) *Attorney, Agent, or Firm* — Conley Rose, P.C.

(57) ABSTRACT

An information prompt method includes collecting an image of an ambient environment of a user to generate a real-scenario image, obtaining information about a point of interest from an electronic map, identifying the real-scenario image to determine a target object, determining a label of the target object and a display position of the label in the real-scenario image based on the information about the point of interest and position information of the electronic device, and displaying an interface including the label and the real-scenario image, where the label is displayed in an overlay mode at the display position in the real-scenario image.

20 Claims, 17 Drawing Sheets

(51) Int. Cl.
  *G06V 20/20* (2022.01)
  *G06V 20/00* (2022.01)
  *G06T 15/06* (2011.01)
  *G06T 15/50* (2011.01)
  *G06V 10/25* (2022.01)

(52) U.S. Cl.
  CPC .............. *G06V 10/25* (2022.01); *G06V 20/20* (2022.01); *G06V 20/36* (2022.01); *G06V 20/38* (2022.01); *G06T 2215/12* (2013.01); *G06T 2215/16* (2013.01); *G06T 2219/004* (2013.01); *G06V 2201/07* (2022.01)

(56) References Cited

U.S. PATENT DOCUMENTS

| | | | | |
|---|---|---|---|---|
| 7,594,194 | B2 * | 9/2009 | Makela | G06F 3/04817 715/251 |
| 7,613,638 | B2 * | 11/2009 | Chakraborty | G06Q 30/0643 705/26.81 |
| 8,437,368 | B2 * | 5/2013 | Krishnamurthi | H04W 36/0022 370/466 |
| 8,533,761 | B1 * | 9/2013 | Sahami | H04N 21/47 725/51 |
| 9,329,762 | B1 * | 5/2016 | Schultz | G06F 3/04845 |
| 2008/0312824 | A1 | 12/2008 | Jung | |
| 2012/0044264 | A1 | 2/2012 | Lee et al. | |
| 2015/0332505 | A1 | 11/2015 | Wang et al. | |
| 2017/0213393 | A1 | 7/2017 | Fedosov et al. | |
| 2019/0188916 | A1 | 6/2019 | Zhang et al. | |

FOREIGN PATENT DOCUMENTS

| | | |
|---|---|---|
| CN | 104359487 A | 2/2015 |
| CN | 104995665 A | 10/2015 |
| CN | 105091895 A | 11/2015 |
| CN | 105659295 A | 6/2016 |
| CN | 105976636 A | 9/2016 |
| CN | 107247510 A | 10/2017 |
| CN | 107918955 A | 4/2018 |
| CN | 108168557 A | 6/2018 |
| CN | 108564662 A | 9/2018 |
| JP | 2014013989 A | 1/2014 |
| WO | 2014169692 A1 | 10/2014 |
| WO | 2015182290 A1 | 12/2015 |

\* cited by examiner

201 — When a touch panel of an electronic device detects an operation of opening an AR augmented reality navigation mode of a navigation application by a user, the touch panel may transfer the detected operation to a processor of the electronic device, and the processor of the electronic device indicates a camera to automatically collect an image of an ambient environment of the user, to generate at least one real-scenario image 202 — The electronic device positions a position of the electronic device, and generates position information of the electronic device 203 — The electronic device obtains information about a point of interest in an electronic map of a specified area based on the position information of the electronic device 204 — The electronic device identifies the generated real-scenario image, determines a target object, matches the information about the point of interest with the identified target object, and generates a label of the target object based on a matching result 205 — The electronic device determines a display position of the label in the real-scenario image based on the position information of the electronic device and coordinate information of the label 206 — The electronic device superimposes the label on the real-scenario image based on the display position, and displays a superimposed virtual reality image on a display screen of the electronic device

FIG. 4

INFORMATION PROMPT METHOD AND ELECTRONIC DEVICE

CROSS-REFERENCE TO RELATED APPLICATIONS

This application is a National Stage of International Patent Application No. PCT/CN2018/109159 filed on Sep. 30, 2018, which is hereby incorporated by reference in its entirety.

TECHNICAL FIELD

This application relates to the field of terminal technologies, and in particular, to an information prompt method and an electronic device.

BACKGROUND

Augmented reality (AR) is a new technology that integrates a real world with a virtual world by aiming at objects in the real word and combining an image computing capability, a position computing capability, and the like. Currently, as some companies launch AR development tools and increase investment in the AR field, the technology continues to be popular. Augmented reality navigation is one of main applications of the augmented reality, for example, an AR navigation function in recently released Google Map. The AR technology is introduced into a walking navigation function by using the AR navigation function. This attracts wide attention in the industry.

In an actual application, the AR navigation function is mainly applied to two scenarios: (1) A navigation scenario with a route, to be specific, a user has a clear target address, and may move forward according to a navigation route or a route label. (2) A view scenario without a route, to be specific, the user does not have a specific target, but the user can refer to building information or store information provided by the AR navigation function.

In the prior art, the building information or the store information provided by the AR navigation function is generally obtained by extracting a text from an image collected onsite by using an optical character recognition technology. Because an electronic device needs to analyze text content in real time while collecting the image onsite, a calculation amount of the electronic device is relatively large. This results in relatively high power consumption of the electronic device.

SUMMARY

This application provides an information prompt method and an electronic device, to implement an augmented reality navigation function with a relatively small calculation amount on the electronic device.

According to a first aspect, an embodiment of this application provides an information prompt method. The method is applicable to an electronic device having a navigation function. The method includes: when the electronic device runs an augmented reality navigation function, collecting, by the electronic device, an image of an ambient environment of a user to generate a real-scenario image, and obtaining information about a point of interest from an electronic map; identifying, by the electronic device, the real-scenario image, to determine a target object; determining, by the electronic device, a label of the target object and a display position of the label in the real-scenario image based on the information about the point of interest and position information of the electronic device; and displaying, by the electronic device, an interface including the label and the real-scenario image, where the label is displayed in an overlay mode at the display position in the real-scenario image.

In this embodiment of this application, after collecting an image of an object in the ambient environment, the electronic device may identify only a typical building in the image, for example, a wall, a ceiling, a floor, a building outline, a floor on which a store is located, and floor spacing, and there is no need to identify names of objects in many obtained images, for example, there is no need to identify a name of the store. This greatly reduces a calculation amount of the electronic device, and reduces power consumption of the electronic device.

In a possible design, the electronic device may obtain information about a point of interest in a specified area from the electronic map based on a shooting direction of the electronic device and the position information of the electronic device, where the specified area includes the position information of the electronic device, and the information about the point of interest include a name of the point of interest and coordinates of the point of interest. Then, the electronic device determines a first relative position relationship between the target object in the real-scenario image and the electronic device, and a second relative position relationship between the point of interest and the user based on the coordinates of the point of interest and the position information of the electronic device. The electronic device determines, based on the first relative position relationship and the second relative position relationship, a target point of interest matching the target object. Finally, the electronic device generates a label of the target object based on information about the target point of interest. It can be learned that, according to the foregoing method, the electronic device may obtain information such as a name of the target object from the point of interest. Therefore, the electronic device does not need to identify names of objects in many obtained images. This reduces a calculation amount of the electronic device.

In a possible design, the electronic device determines coordinates of the target object based on coordinates of the target point of interest. Then, the electronic device determines center coordinates of the label of the target object in the real-scenario image based on the coordinates of the target object and the position information of the electronic device. Finally, the electronic device determines the display position of the label in the real-scenario image based on the center coordinates.

In this embodiment of this application, the electronic device determines the central coordinates of the label, and displays the label at a corresponding position in the real-scenario image. Because the label may include information such as a store name, relatively clear and accurate information can be provided for the user.

In a possible design, the display position of the electronic device is at a middle-to-upper position on a wall of the target object, or on a shelf, and the display position is not in a display area of any one of the following features of the real-scenario image: sky, a ceiling, a road, ground, a staircase, and floor spacing. In this way, the display position of the label is more user-friendly, providing better user experience.

In a possible design, when the electronic device determines that the electronic device is located outdoors, a feature identified by the electronic device from the real-scenario image includes any one or any combination of the following: a wall, a road, sky, and a building outline, and the target object is determined based on the identified feature. Alternatively, when the electronic device determines that the electronic device is located indoors, a feature identified by the electronic device from the real-scenario image includes any one or any combination of the following: a ceiling, ground, a road, a staircase, floor spacing, and a store wall, and the target object is determined based on the identified feature.

In other words, in this embodiment of this application, the electronic device can specifically identify a corresponding feature based on different indoor and outdoor scenarios, so that target objects can be more accurately identified in different scenarios.

In a possible design, when the electronic device determines, based on information collected by an ambient optical sensor of the electronic device, that luminance of an ambient environment of the electronic device changes, the electronic device adjusts a display parameter of the label based on the current information collected by the ambient optical sensor, where the display parameter includes any one or any combination of the following: a font color and background transparency. Alternatively, in a possible design, when the electronic device determines that background luminance of the real-scenario image changes, the electronic device adjusts a display parameter of the label based on the current background luminance of the real-scenario image, where the display parameter includes any one or any combination of the following: a font color and background transparency. In this way, a problem that the label is not clearly displayed can be avoided. Even if the electronic device is in a moving process or in different time periods, the real-scenario image photographed by the electronic device varies with a background environment of the image. This improves user experience.

In a possible design, the electronic device automatically switches a display style of the label from an outdoor label display style to an indoor label display style when the electronic device determines, based on a positioning result of the electronic device, that the electronic device moves from an outdoor position to an indoor position. Alternatively, the electronic device automatically switches a display style of the label from an indoor label display style to an outdoor label display style when the electronic device determines, based on a positioning result of the electronic device, that the electronic device moves from an indoor position to an outdoor position.

The outdoor label display style includes any one or any combination of the following: that content of the label includes a name of the target object and a distance between the target object and the electronic device, and that labels are loosely arranged in the real-scenario image and are irregularly arranged. The indoor label display style includes any one or any combination of the following: that content of the label includes a name of the target object, a distance between the target object and the electronic device, and a floor on which the target object is located, and that labels are compactly arranged in the real-scenario image and are arranged based on a floor on which the target object is located.

In this way, in an augmented reality navigation mode, the electronic device can adaptively display labels in an indoor/outdoor scenario and a typical scenario without a manual selection of the user, so that the augmented reality navigation function is more intelligent, and user experience is improved.

According to a second aspect, an embodiment of this application provides an electronic device, including a processor, a memory, a display, and a camera. The memory is configured to store one or more computer programs. When the one or more computer programs stored in the memory are executed by the processor, the electronic device is enabled to implement the method in any possible design in the first aspect.

According to a third aspect, an embodiment of this application further provides an electronic device, where the electronic device includes a module/unit for performing the method in any one of the first aspect or the possible designs of the first aspect. These modules/units may be implemented by hardware, or may be implemented by hardware by executing corresponding software.

According to a fourth aspect, an embodiment of this application further provides a computer-readable storage medium, where the computer-readable storage medium includes a computer program, and when the computer program runs on an electronic device, the electronic device is enabled to perform the method in any possible design.

According to a fifth aspect, an embodiment of this application further provides a computer program product. When the computer program product runs on an electronic device, the electronic device is enabled to perform the method in any possible design.

These aspects or other aspects in this application may be clearer and more intelligible in descriptions in the following embodiments.

BRIEF DESCRIPTION OF DRAWINGS

FIG. 4 is a schematic diagram of an information prompt method according to an embodiment of this application;

DESCRIPTION OF EMBODIMENTS

The following describes the technical solutions in the embodiments of this application with reference to the accompanying drawings in the embodiments of this application. In the following descriptions of the embodiments of this application, the terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the description of the embodiment of this application, unless otherwise stated, "a plurality of" means two or more than two.

Figure 1:
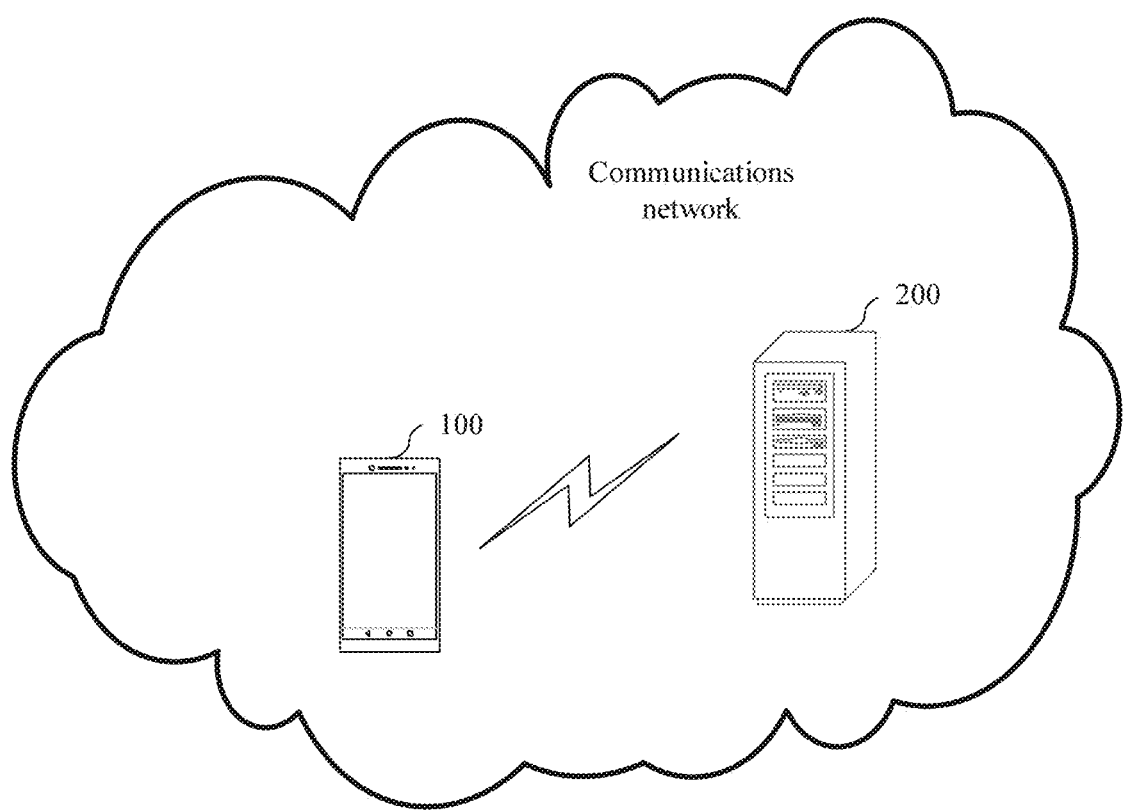
FIG. 1 is a schematic diagram of a communication scenario according to an embodiment of this application.

The information prompt method provided in this embodiment of this application may be applied to a communication scenario shown in FIG. 1, an electronic device 100, and a server 200. The electronic device 100 obtains information about a point of interest in an electronic map from the server 200, and then calculates a label of an object in a real-scenario image and a display position in the real-scenario image.

The electronic device and the server are interconnected through a communications network. The communications network may be a local area network, or may be a wide area network connected by using a relay device. When the communications network is the local area network, for example, the communications network may be a short-distance communications network such as a Wi-Fi hotspot network, a Wi-Fi P2P network, a Bluetooth network, a ZigBee network, or a near field communication (NFC) network. When the communications network is the wide area network, for example, the communications network may be a third generation mobile communications technology (3G) network, a fourth generation mobile communications technology (4G) network, a fifth generation mobile communications technology (5G) network, a future evolved public land mobile network (PLMN), or an internet.

In some embodiments of this application, the electronic device 100 shown in FIG. 1 may be a portable electronic device that has a navigation function and an image collection function, for example, a mobile phone, a tablet computer, or a wearable device (such as virtual reality glasses) that has a wireless communication function. An example embodiment of the portable electronic device includes but is not limited to a portable electronic device using iOS, Android, Microsoft, or another operating system. The portable electronic device may also be another portable electronic device, for example, a laptop computer with a touch-sensitive surface (for example, a touch panel). It should be further understood that in some other embodiments of this application, the electronic device 100 may not be the portable electronic device, but a desktop computer having the touch-sensitive surface (for example, a touch panel).

Figure 2:
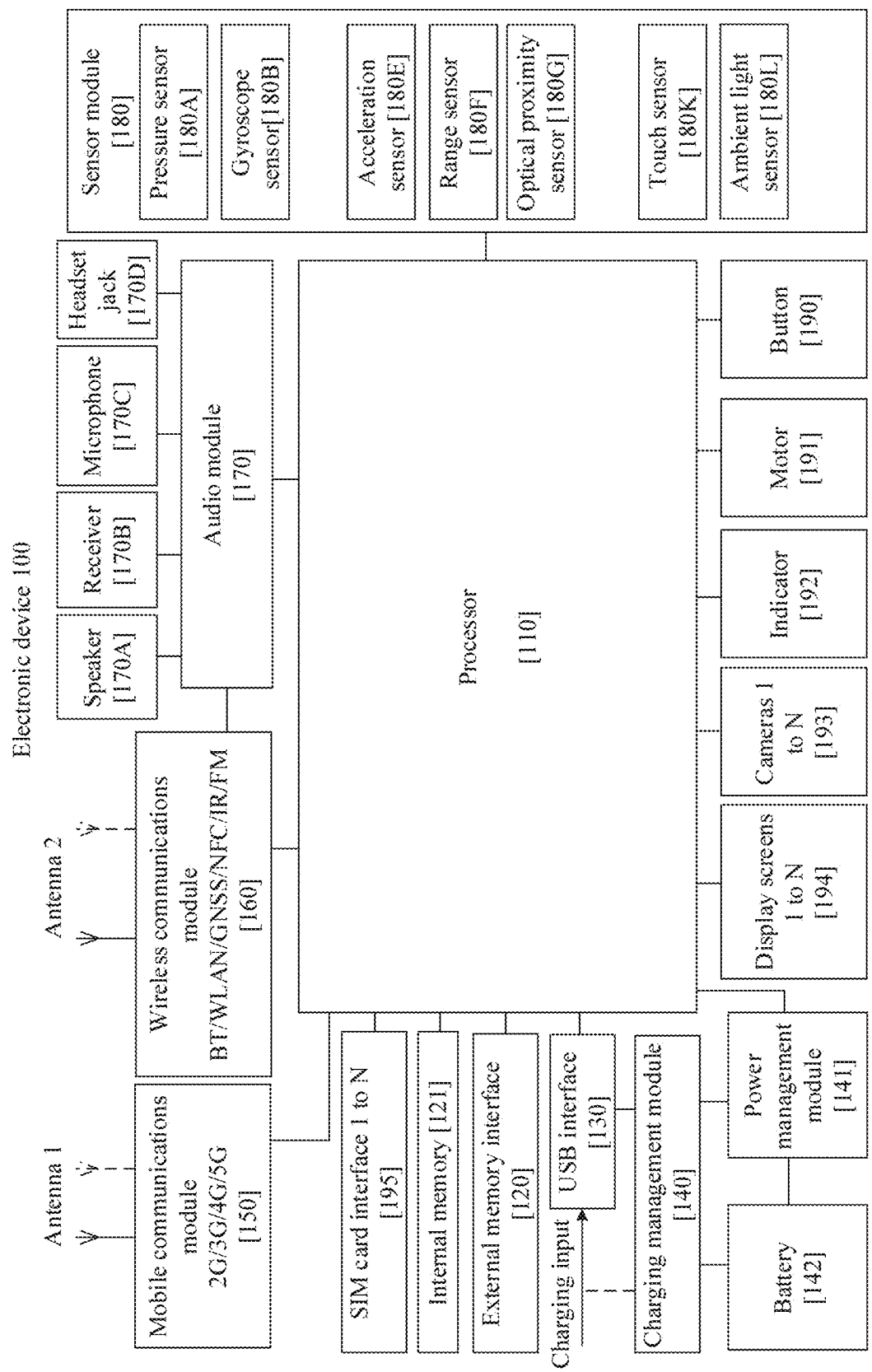
FIG. 2 is a schematic structural diagram of an electronic device according to an embodiment of this application.

For example, as shown in FIG. 2, the following uses the electronic device 100 as an example to specifically describe this embodiment.

The electronic device 100 may include a processor 110, an external memory interface 120, an internal memory 121, a USB interface 130, a charging management module 140, a power supply management module 141, a battery 142, an antenna 1, an antenna 2, a communications module 150, a wireless communications module 160, an audio module 170, a loudspeaker 170A, and a receiver 170B, a microphone 170C, a headset interface 170D, a sensor module 180, a button 190, a motor 191, an indicator 192, a camera 193, a display screen 194, a SIM card interface 195, and the like. The sensor module 180 may include a pressure sensor 180A, a gyro sensor 180B, an acceleration sensor 180E, a distance sensor 180F, an optical proximity sensor 180G, a fingerprint sensor 180H, a temperature sensor 180J, a touch sensor 180K, an ambient optical sensor 180L, and the like.

It may be understood that the structure shown in this embodiment of this application does not constitute a specific limitation on the electronic device 100. In some other embodiments of this application, the electronic device 100 may include more or fewer components than those shown in FIG. 1, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, and a video codec, a digital signal processor (DSP), a baseband processor, a neural-network processing unit (NPU), and/or the like. Different processing units may be independent components, or may be integrated into one or more processors. The application processor is mainly configured to start the camera when detecting an operation of enabling an augmented reality navigation function by a user. The graphics processing unit is configured to identify a real-scenario image collected by the camera.

The controller may be a nerve center and a command center of the electronic device 100. The controller may generate an operation control signal based on instruction operation code and a time sequence signal, to complete control of instruction fetching and instruction execution.

A memory may be further disposed in the processor 110, and is configured to store an instruction and data. In some embodiments, the memory in the processor 110 is a high-speed buffer storage. The memory may store an instruction or data that is just used or cyclically used by the processor 110. If the processor 110 needs to use the instruction or the data again, the processor 110 may directly invoke the instruction or the data from the memory, to avoid repeated access and reduce a waiting time period of the processor 110. This improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The USB interface 130 is an interface that conforms to a USB standard specification, and may be specifically a mini USB interface, a micro USB interface, a USB Type-C interface, or the like. The USB interface may be configured to connect to a charger to charge the electronic device 100, or may be configured to perform data transmission between the electronic device 100 and a peripheral device, The USB interface 130 may alternatively be configured to connect to a headset, to play audio by using the headset. The interface may alternatively be configured to connect to another electronic device such as an AR device.

It may be understood that an interface connection relationship between the modules that is shown in this embodiment of the present invention is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger.

The power management module 141 is connected to the battery 142, the charging management module 140, and the processor 110. The power management module 141 receives input of the battery 142 and/or the charging management module 140, and supplies power to the processor 110, the internal memory 121, an external memory, the display screen 194, the camera 193, the wireless communications module 160, and the like. The power management module 141 may be further configured to monitor parameters such as a battery capacity, a battery cycle count, and a battery health status (electric leakage or impedance). A wireless communication function of the electronic device 100 may be implemented by using the antenna module 1, the antenna module 2, the communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover a single communications frequency band or a plurality of communications frequency bands. Different antennas may further be multiplexed, to improve antenna utilization. For example, a cellular network antenna may be multiplexed as a wireless local area network diversity antenna. In some other embodiments, the antenna may be used in combination with a tuning switch.

The mobile communications module 150 may provide a solution for wireless communication that is of 2G, 3G, 4G, 5G, or the like and that is applied to the electronic device 100. The mobile communications module 150 may include at least one filter, a switch, a power amplifier, a low noise amplifier (LNA), and the like. The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor, and is then transferred to the application processor. The application processor outputs a sound signal by using an audio device (which is not limited to the loudspeaker 170A, the receiver 170B, or the like), or displays an image or a video by using the display screen 194. The wireless communications module 160 may provide a solution, applied to the electronic device 100, to wireless communication including a wireless local area network (WLAN), Bluetooth (BT), a global navigation satellite system (GNSS), frequency modulation (FM), a near field communication (NFC) technology, an infrared (IR) technology, and the like. In some embodiments, the antenna 1 and the mobile communications module 150 of the electronic device 100 are coupled, and the antenna 2 and the wireless communications module 160 of the electronic device 100 are coupled, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 implements a display function by using the GPU, the display screen 194, the application processor, and the like. The GPU is a microprocessor for image processing, and is connected to the display screen 194 and the application processor. The GPU is configured to perform mathematical and geometric calculation, and is configured to render an image. The processor 110 may include one or more GPUs that execute a program instruction to generate or change display information.

The display screen 194 is configured to display a virtual reality image, a video, and the like that are formed by superimposing the label and the real-scenario image. The display screen 194 includes a display panel. The display panel may use an LCD (liquid crystal display), an OLED (organic light-emitting diode), an active-matrix organic light emitting diode (AMOLED), a flexible light-emitting diode (FLED), a mini-LED, a micro-LED, a micro-OLED, a quantum dot light-emitting diode (QLED), or the like. In some embodiments, the electronic device 100 may include one or N display screens, where N is a positive integer greater than 1.

The electronic device 100 may implement the photographing function by using the ISP, the camera 193, the video codec, the GPU, the display screen 194, the application processor, and the like.

The ISP is configured to process data fed back by the camera 193. For example, during photographing, a shutter is turned on, a ray of light is transmitted to a photosensitive element of the camera through a lens, an optical signal is converted into an electrical signal, the photosensitive element of the camera transmits the electrical signal to the ISP for processing, and the electrical signal is converted into an image that can be seen. The ISP may further optimize an algorithm for noise, brightness, and complexion of an image. The ISP may further optimize parameters such as exposure and a color temperature of a photographing scene. In some embodiments, the ISP may be disposed in the camera 193.

The camera 193 is configured to capture a static image or a video. An optical image of an object is generated by using the lens, and is projected to a photosensitive element. The photosensitive element may be a charge coupled device (CCD) or a complementary metal-oxide-semiconductor (CMOS) photoelectric transistor. The photosensitive element converts an optical signal into an electrical signal, and then transmits the electrical signal to the ISP to convert the electrical signal into a digital image signal. The ISP outputs the digital image signal to a DSP for processing. The DSP converts the digital image signal into an image signal of a standard format such as RGB and YUV. In some embodiments, the electronic device 100 may include one or N cameras, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy, or the like.

The video codec is configured to compress or decompress a digital video. The electronic device 100 may support one or more video codecs. In this way, the electronic device 100 may play or record videos in a plurality of coding formats, for example, MPEG1, MPEG2, MPEG3, and MPEG4.

The NPU is a neural-network (NN) processing unit, quickly processes input information by referring to a structure of a biological neural network, for example, by referring to a transfer mode between human brain neurons, and may further continuously perform self-learning. The external memory interface 120 may be configured to connect to an external storage card such as a micro SD card, to extend a storage capability of the electronic device 100. The external storage card communicates with the processor 110 through the external memory interface 120, to implement a data storage function. For example, music and videos are stored in the external storage card.

The internal memory 121 may be configured to store computer executable program code (for example, a navigation application, or another algorithm or application that can be invoked by a navigation application), and the executable program code includes an instruction. The processor 110 runs the instruction stored in the internal memory 121, to implement various function applications and data processing of the electronic device 100. The memory 121 may include a program storage area and a data storage area. The program storage area may store an operating system, an application program required by at least one function (such as Baidu map and Amap), and the like. The data storage area may store data (such as a photo) created in a use process of the electronic device 100, and the like. In addition, the internal memory 121 may include a high-speed random access memory, and may further include a nonvolatile memory such as at least one disk storage device, a flash memory, or a universal flash storage (UFS).

The electronic device 100 can implement an audio function, for example, music playing and recording, by using the audio module 170, the loudspeaker 170A, the phone receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to code and decode an audio signal. The loudspeaker 170A, also referred to as a "horn", is configured to convert an audio electrical signal into a sound signal. The electronic device 100 may be configured to listen to music or answer a hands-free call by using the loudspeaker 170A.

The receiver 170B, also referred to as an "earpiece", is configured to convert an audio electrical signal into a sound signal. When the electronic device 100 answers a call or receives voice information, the receiver 170B may be placed close to a human ear to listen to a voice.

The microphone 170C, also referred to as a "mike" or a "microphone", is configured to convert a sound signal into an electrical signal. The headset jack 170D is configured to be connected to a wired headset. The headset jack may be a USB interface, or may be a 3.5 mm open mobile terminal platform (OMTP) standard interface or cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display screen 194.

The gyro sensor 180B may be configured to determine a moving posture of the electronic device 100.

The acceleration sensor 180E may detect magnitude of accelerations in various directions (usually on three axes) of the electronic device 100, and may detect magnitude and a direction of gravity when the electronic device 100 is static. The acceleration sensor 180E may be further configured to identify a posture of the electronic device, and is applied to applications such as landscape/portrait orientation switching and a pedometer.

The distance sensor 180F is configured to measure a distance. The electronic device 100 may measure the distance by using an infrared ray or a laser. In some embodiments, in a photographing scene, the electronic device 100 may use the distance sensor 180F to measure a distance to implement fast focusing.

The optical proximity sensor 180G may include a light-emitting diode (LED) and an optical detector, for example, a photodiode. The light-emitting diode may be an infrared light-emitting diode. The electronic device 100 emits infrared light through the light-emitting diode. The electronic device 100 detects infrared reflected light from a nearby object through the photodiode. When sufficient reflected light is detected, the electronic device 100 may determine that there is the object near the electronic device 101. When insufficient reflected light is detected, the electronic device 100 may determine that there is no object near the electronic device 100. The electronic device 100 may detect, by using the optical proximity sensor 180G, that the user holds the electronic device 100 close to an ear to make a call, so that the electronic device 100 automatically turns off the screen to save power. The optical proximity sensor 180G may also be used in a flip cover mode or a pocket mode to automatically unlock or lock the screen.

The ambient light sensor 180L is configured to sense ambient light brightness. The electronic device 100 may adaptively adjust brightness of the display screen 194 based on the sensed ambient light brightness. The ambient light sensor 180L may further be configured to automatically adjust a white balance during the photographing. The ambient light sensor 180L may further cooperate with the optical proximity sensor 180G to detect whether the electronic device 100 is in a pocket, to avoid an accidental touch.

The touch sensor 180K is also referred to as a "touch panel", and may be disposed on the display screen 194. The touch sensor 180K is configured to detect a touch operation performed on or near the display screen. The touch sensor 180K may transfer the detected touch operation to the application processor, to determine a type of touch event, and to provide corresponding visual output by using the display screen 194. In some other embodiments, the touch sensor 180K may also be disposed on a surface of the electronic device 100 at a position different from a position of the display screen 194.

The button 190 includes a power button, a volume button, and the like. The button may be a mechanical button, or may be a touch button. The electronic device 100 may receive key input, generate key signal input related to user setting and function control of the electronic device 100.

The motor 191 may generate a vibration prompt. The motor 191 may be used for an incoming call vibration prompt, or may be used for a touch vibration feedback. For example, touch operations performed on different applications (for example, a photographing application and an audio playing application) may correspond to different vibration feedback effects. The motor 191 may also correspond to different vibration feedback effects for touch operations performed on different areas of the display screen 194. Different application scenarios (for example, a time reminder, information receiving, an alarm clock, a game, and the like) may also correspond to different vibration feedback effects. The touch vibration feedback effect can also be customized.

The indicator 192 may be an indicator light that may be configured to indicate a charging state and a power change, or may be configured to indicate a message, a missed call, a notification, and the like.

The SIM card interface 195 is configured to be connected to a subscriber identity module (SIM). The SIM card may be inserted into the SIM card interface 195 or detached from the SIM card interface 195, to implement contact with or separation from the electronic device 100. The electronic device 100 may support one or N SIM card interfaces, where N is a positive integer greater than 1. The SIM card interface 195 may support a nano SIM card, a micro SIM card, an SIM card, and the like. A plurality of cards may be inserted into a same SIM card interface simultaneously. The plurality of cards may be of a same type or different types. The SIM card interface 195 may also be compatible with different types of SIM cards. The SIM card interface 195 may also be compatible with an external storage card. The electronic device 100 interacts with a network by using the SIM card, to implement a call function, a data communication function, and the like. In some embodiments, the electronic device 100 uses an eSIM, namely, an embedded SIM card. The eSIM card may be embedded in the electronic device 100 and cannot be separated from the electronic device 100.

A software system of the electronic device 100 may use a layered architecture, an event-driven architecture, a microkernel architecture, a micro service architecture, or a cloud architecture. In this embodiment of this application, an Android system of a layered architecture is used as an example to illustrate a software structure of the electronic device 100.

Figure 3:
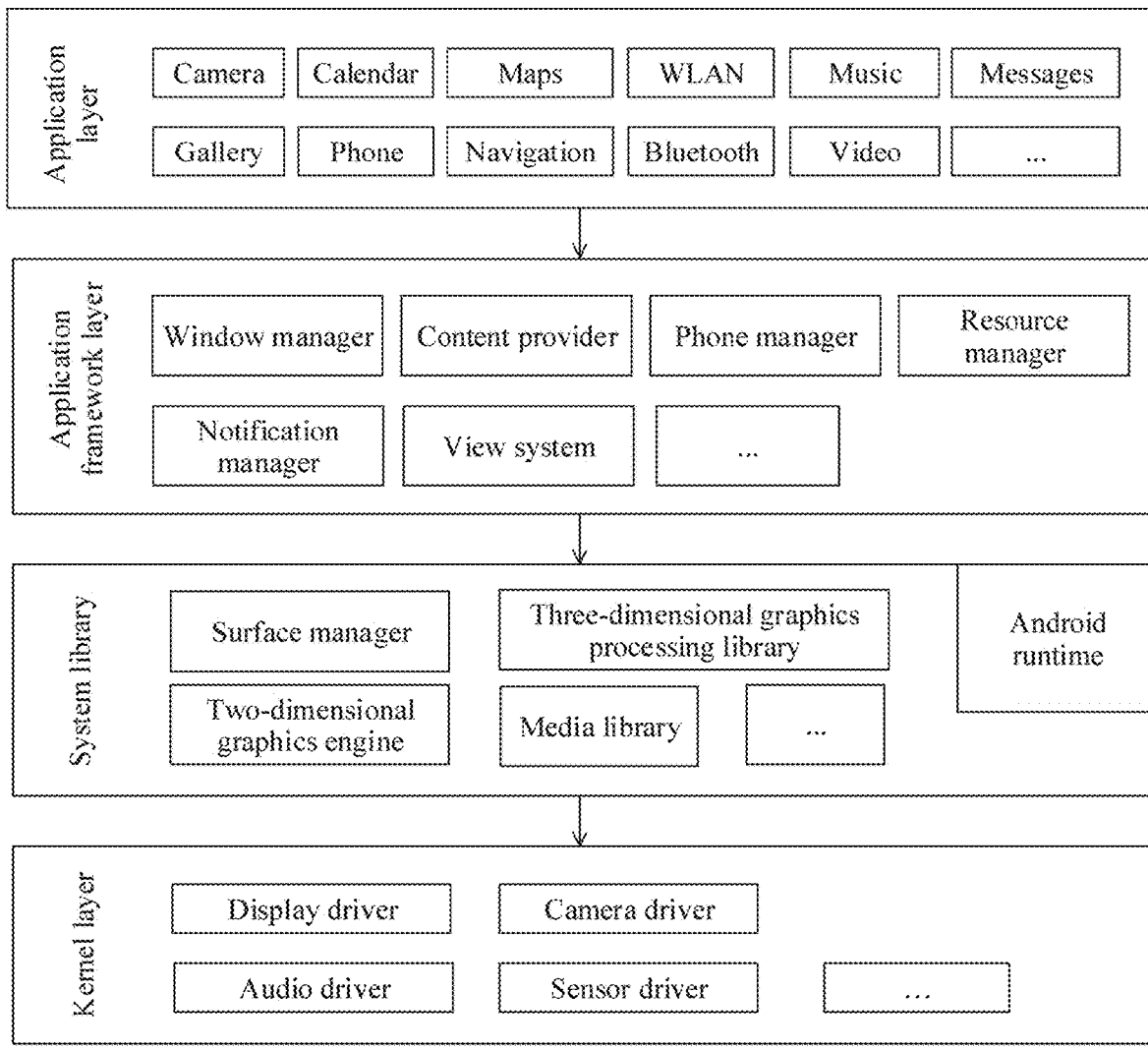
FIG. 3 is a schematic architectural diagram of an Android operating system according to an embodiment of this application.

FIG. 3 is a block diagram of a software structure of an electronic device 100 according to an embodiment of the present invention.

An operating system is an Android system. A layered architecture divides the Android system into several layers, and each layer has clear roles and responsibilities. The layers communicate with each other through software interfaces. In some embodiments, the Android system is divided into four layers, namely, an application program layer, an application framework layer, Android runtime, a system library, and a kernel layer from top to bottom.

The application program layer may include a series of application packages.

As shown in FIG. 3, the application packages may include application programs such as camera, gallery, calendar, phone, map, navigation, WLAN, Bluetooth, music, video, and SMS message.

The application framework layer provides an application programming interface (API) and a programming framework for an application program at the application program layer. The application program framework layer includes some predefined functions.

As shown in FIG. 3, the application framework layer may include a window manager, a content provider, a view system, a telephone manager, a resource manager, a notification manager, and the like.

The window manager is configured to manage a window program. The window manager may obtain a size of a display screen, determine whether there is a status bar, perform screen locking, take a screenshot of the display screen, and the like.

The content provider is configured to store and obtain data, and make the data accessible to an application program. The data may include a video, an image, audio, calls that are made and received, a browsing history and bookmarks, an address book, and the like.

The view system includes a visual control such as a text display control, or a picture display control. The view system can be used to construct an application program. A display interface may include one or more views. For example, a display interface formed by overlaying a label and a real-scenario image may include a view for displaying a text and a view for displaying a picture.

The phone manager is configured to provide a communication function of the electronic device 100, for example, management of call statuses (including a connected state, a disconnected state, and the like).

The resource manager provides various resources for an application program, such as localized strings, icons, pictures, layout files, and video files.

The notification manager enables an application program to display notification information in a status bar, and may be configured to convey a notification-type message. The notification-type message may automatically disappear after the message is displayed for a short period of time, without user interaction. For example, the notification manager is configured to notify that download is completed, a message reminder, and the like. The notification manager may alternatively be a notification that appears on the top of a status bar of a system in a text form of a graph or a scroll bar, for example, a notification of an application program running in a background or a notification that appears on a screen in a form of a dialog window. For example, text information is prompted in the status bar, a prompt tone is produced, the electronic device vibrates, or the indicator light blinks.

The Android runtime includes a kernel library and a virtual machine, and the Android runtime is responsible for scheduling and management of the Android system.

The kernel library includes two parts: a functional function that needs to be invoked by a Java language and a kernel library of Android.

The application program layer and the application program framework layer may run in the virtual machine. The virtual machine executes a Java file at the application program layer and the application program framework layer as a binary file. The virtual machine is configured to perform functions such as object lifecycle management, stack management, thread management, security and exception management, and garbage collection.

The system library may include a plurality of function modules, for example, a surface manager, a media library, a three-dimensional graphics processing library (for example, OpenGL ES), and a 2D graphics engine (for example, SGL).

The surface manager is configured to manage a display subsystem, and provide fusion of 2D and 3D image layers for a plurality of application programs.

The media library supports playback and recording of a plurality of commonly used audio and video formats, static image files, and the like. The media library may support a plurality of audio and video coding formats such as MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

All the following embodiments may be implemented on the electronic device 100 having the foregoing hardware structure. In the following embodiment, an example in which the electronic device 100 is an electronic device is used to describe the information prompt method provided in the embodiment of this application. The method mainly includes: collecting, by the electronic device, an image of an object in an ambient environment of a user, to generate a real-scenario image; then obtaining, by the electronic device, information about a point of interest in an electronic map, to generate a label of each object in the real-scenario image; and finally superposing and displaying the label of each object in the real-scenario image. Because the information about the point of interest in the electronic map includes information such as coordinates and a name of the point of interest, and position information of the electronic device may be obtained through positioning, the electronic device may determine the label of each object and a display position of the label in the real-scenario image. In this way, after collecting the image of the object in the ambient environment, the electronic device may identify only a typical building in the image, for example, a wall, a ceiling, a floor, a building outline, a floor on which a store is located, and floor spacing, and the electronic device does not need to identify names of objects in many obtained images, for example, the electronic device does not need to identify a name of the store. This greatly reduces a calculation amount of the electronic device, and reduces power consumption of the electronic device.

Specifically, with reference to the structure of the electronic device in FIG. 2, a specific process of the information prompt method is described in detail in the following embodiment of this application. Referring to FIG. 4, the specific procedure of the method may include the following steps.

Step 201: When a touch panel of an electronic device detects an operation of opening an AR augmented reality navigation mode of a navigation application by a user, the touch panel detects the operation of the user, and notifies a processor of the electronic device; the processor of the electronic device indicates a camera to be turned on; and the camera collects an image of an ambient environment of the user, and generates at least one real-scenario image to be displayed on a display screen.

The real-scenario image may be an image directly photographed by the camera, or may be an image that can represent the ambient environment of the user and that is obtained after real enhancement processing or other processing is performed on an image photographed by the camera. This is not limited in this embodiment of the present invention.

Step 202: A positioning module on the electronic device positions a position of the electronic device, to generate position information of the electronic device.

It may be understood that the positioning module may be specifically a receiver of a positioning system such as a global positioning system (GPS) or a BeiDou navigation satellite system.

It should be noted that there is no strict execution sequence between the step 202 and the step 201. The step 201 may be performed first, and then the step 202 is performed; or the step 202 may be performed first, and then the step 201 is performed; or the two steps are performed simultaneously.

Step 203: An application processor of the electronic device obtains information about a point of interest in an electronic map of a specified area based on the position information of the electronic device, where the specified area includes the position of the electronic device.

Step 204: A graphics processing unit of the electronic device identifies the generated real-scenario image, determines a target object, and sends a feature of the identified target object to the application processor; and the application processor matches the information about the point of interest with the target object, and generates a label of the target object based on a matching result.

Step 205: The application processor of the electronic device determines a display position of the label in the real-scenario image based on the position information of the electronic device and coordinate information of the label.

Step 206: The application processor of the electronic device superimposes the label on the real-scenario image based on the display position, and sends a superimposed image to the display screen, so that the display screen displays the superimposed virtual reality image.

Specifically, there are two manners for the electronic device to obtain the information about the point of interest in the electronic map of the specified area. In one manner, when the electronic device detects that the user starts the navigation application, the electronic device may establish a network connection to an application server of the navigation application, and when the user enters a type of point of interest or a name of the point of interest, the electronic device may download, from the application server, the information about the point of interest in the electronic map of the specified area to the electronic device. In another manner, when downloading and installing the navigation application, the electronic device may also download the information about the point of interest in the electronic map to the electronic device. In this way, when the step 203 is performed, and when entering the type of point of interest or the name of the point of interest, the electronic device may directly obtain the information about the point of interest from a database on the electronic device. Because a building name, a store name, and the like in the electronic map often change, in this application, the former manner is preferentially used to obtain the information about the point of interest. In addition, the specified area is generally determined based on an empirical value. If the electronic device is located outdoors, the specified area is no more than 200 meters. If the electronic device is located indoors, the specified area is no more than 30 meters.

In addition, it should be noted that the information about the point of interest is a concept in a geographic information system, generally includes information such as the name of the point of interest, the coordinates of the point of interest, and the type of point of interest, and is usually collected and stored in a data system in advance by a collector. For example, the type of points of interest may be a restaurant, a barber shop, or a cafe. Names of points of interest corresponding to restaurants may be KFC, McDonald's, Sichuan restaurant, Hunan restaurant, or the like. The coordinates of the point of interest are longitude and latitude coordinates of the point of interest in the map, for example, longitude and latitude coordinates of the KFC store in the map. In the step 203, the information that is about the point of interest and that is obtained by the electronic device may be obtained through screening by using a keyword entered by the user, or may be obtained through screening based on the type that is of the point of interest and that is set by the electronic device by default. For example, if the electronic device sets, by default, that points of interest of banks and restaurants need to be displayed in walking navigation, the electronic device obtains information about the points of interest of the banks and the restaurants from the electronic map of the specified area through screening.

Figure 5A:
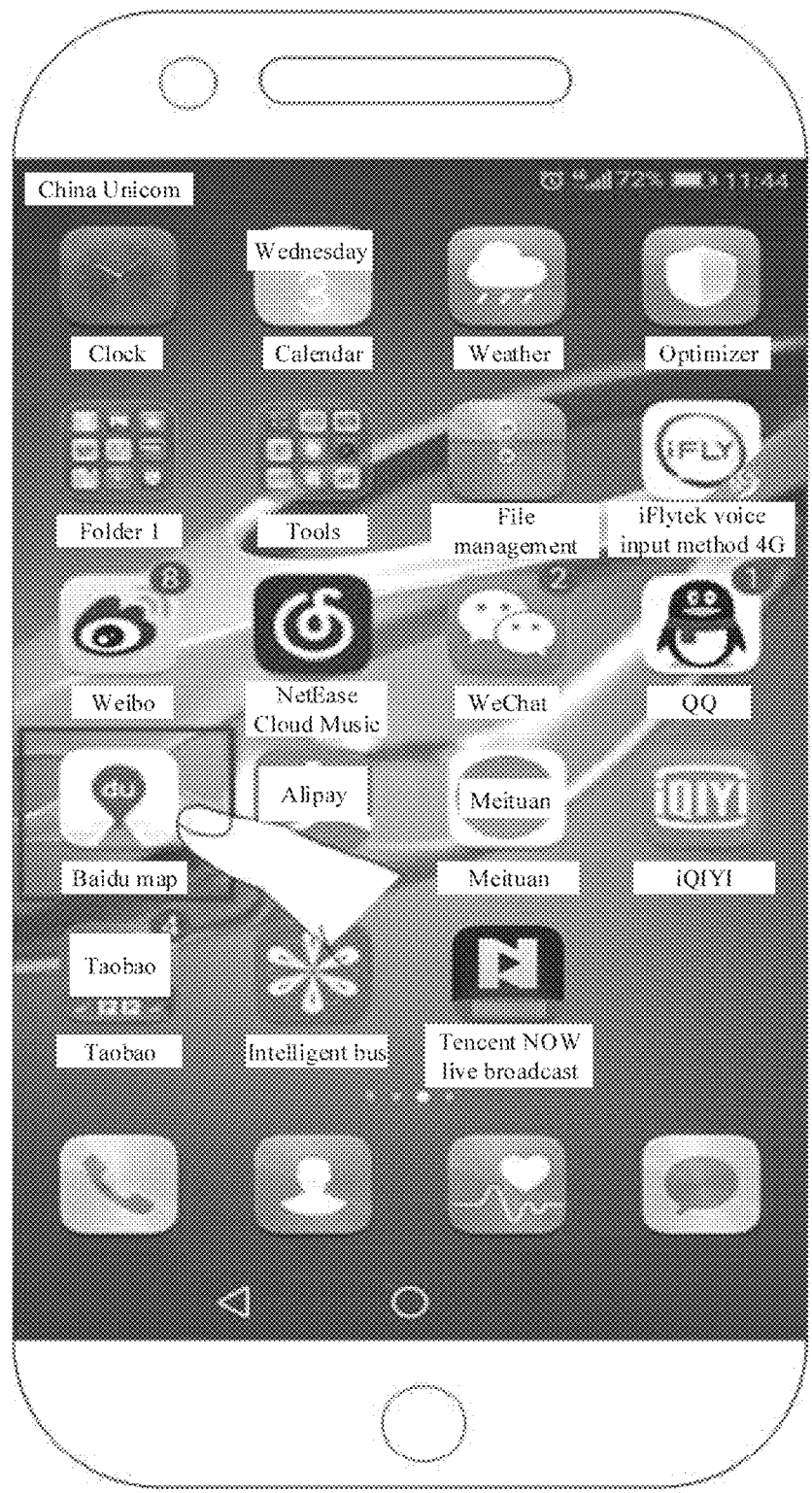
FIG. 5a, FIG. 5b, FIG. 6a and FIG. 6b are schematic diagrams of an interface of an application scenario according to an embodiment of this application.
Figure 5B:
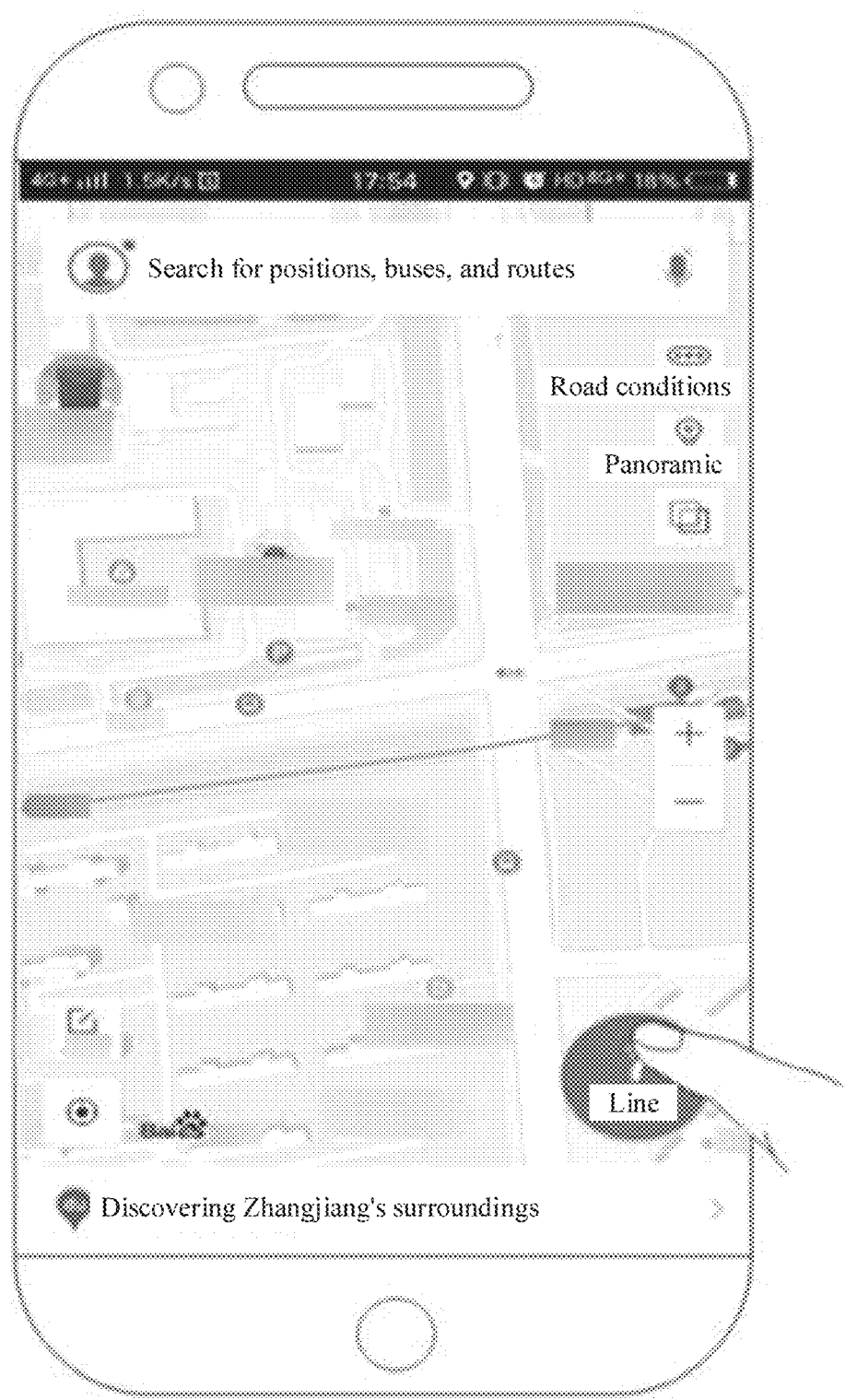
Figure 6A:
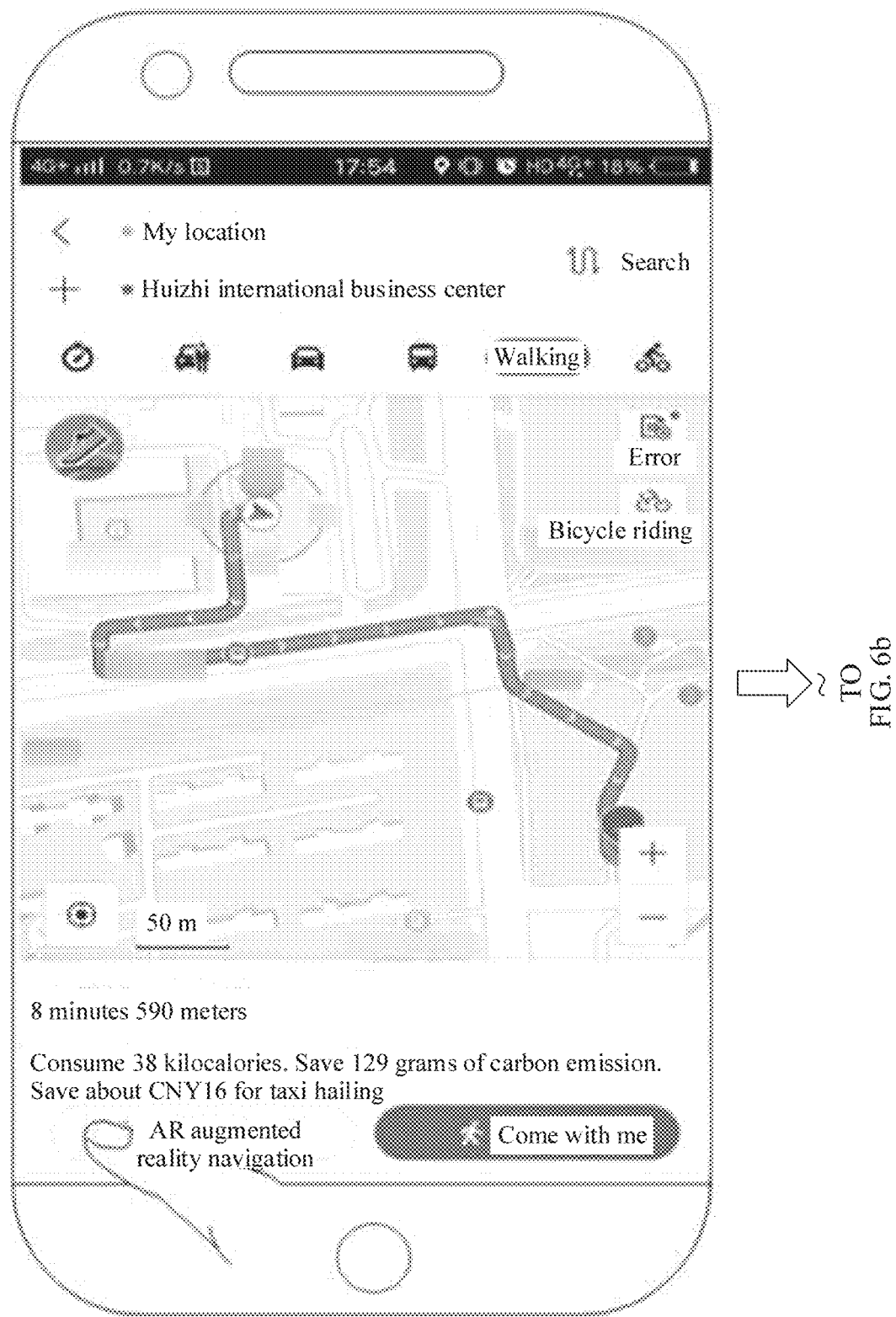
Figure 6B:
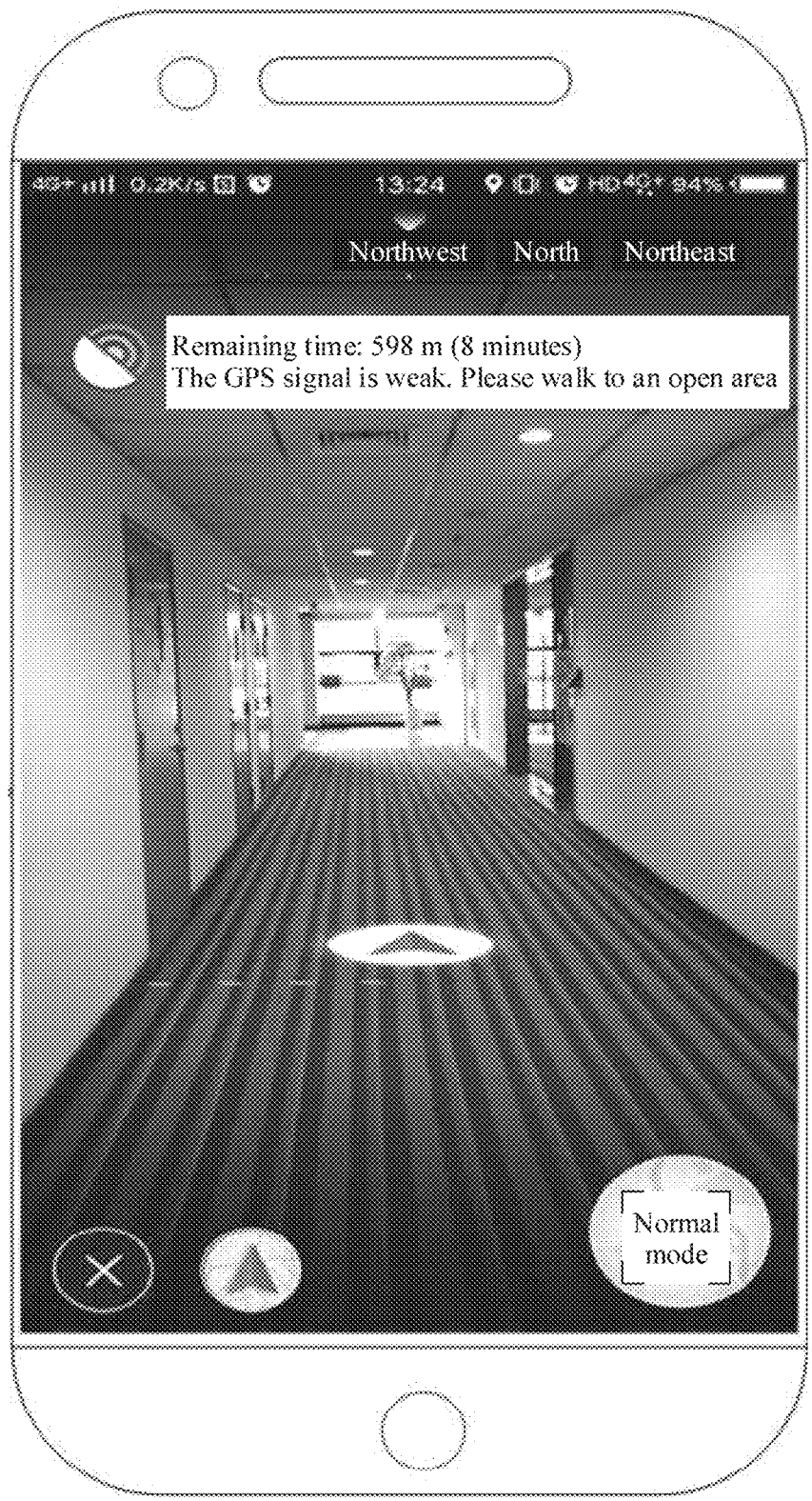

For the steps shown in FIG. 4, this embodiment of this application is further described with reference to the scenarios shown in FIG. 5a, FIG. 5b, FIG. 6a, and FIG. 6b. As shown in FIG. 5a and FIG. 5b, the electronic device detects an operation performed by the user on an application icon of the Baidu map. In response to the operation, the electronic device displays an electronic map interface, as shown in FIG. 5b. Further, referring to FIG. 6a and FIG. 6b, when the electronic device detects an operation performed by the user on a control of a route, in response to the operation, the electronic device displays a navigation path graph. As shown in FIG. 6b, when the electronic device detects an operation performed by the user on a control of an AR augmented reality navigation path, in response to the operation, the electronic device starts a camera to collect an image of an ambient environment, and displays an interface diagram shown in FIG. 6b.

Because the real-scenario image photographed by the electronic device is an area in the specified area, the target object determined by the electronic device by identifying the real-scenario image is also an object in the specified area. Therefore, the electronic device may determine a label of each object in the real-scenario image based on the position information of the electronic device and the coordinates in the information about the point of interest. The label may include a name of the object, a straight-line distance between the object and the electronic device, and the like. For example, the real-scenario image photographed by the electronic device is a part scenario in a university campus, and the electronic device identifies the real-scenario image, and determines that the target objects are three buildings in the university campus. Further, the electronic device may obtain, through matching based on the position information of the electronic device, a space position relationship between each object in the real-scenario image and the electronic device, and coordinate information in the obtained information about the points of interest, names of the points of interest respectively corresponding to the buildings. For example, the names of the target objects are teaching building, library, and canteen. Specifically, if the electronic device determines, by identifying the real-scenario image, that the space position relationships between the target objects and the electronic device are that: one building is located in left front of the electronic device, one building is located on the opposite side of the electronic device, and the other building is located in right front of the electronic device, the electronic device determines, based on the position information of the electronic device and the coordinate information in the information about the point of interest, that the relative position relationships between the points of interest and the electronic device are that: the point of interest of the library is located in left front of the electronic device, the point of interest of the teaching building is located on the opposite side of the electronic device, and the point of interest of the canteen is located in right front of the electronic device. After the electronic device and the points of interest are matched, it can be determined that the building in left front of the electronic device is the library, the building on the opposite side of the electronic device is the teaching building, and the building in right front of the electronic device is the canteen. If the space position relationships between the target objects and the electronic device are that: one building is located in left front of the electronic device, and two buildings are located on the opposite side of the electronic device, orientations are different. When the electronic device identifies the objects in the real-scenario image, distances between the two buildings on the opposite side of the electronic device and the electronic device may be identified as different. Therefore, the electronic device may determine, based on the position information of the electronic device and the coordinate information in the information about the point of interest, that the building in left front of the electronic device is the library, a near building on the opposite side of the electronic device is the teaching building, and the farther building is the canteen.

In some embodiments, the electronic device may further calculate the straight-line distance between the electronic device and the target object based on the position information of the electronic device and the coordinates of the point of interest corresponding to the target object. In this way, the label that is of the target object and that is finally generated by the electronic device may include the name of the target object, and further include distance information. For example, a label of the library is generated by the electronic device may be: library, 50 meters away from the electronic device. In addition, the label that is of the target object and that is finally generated by the electronic device includes a display shape of the label of the target object. The display shape may be a rectangular box, a circular box, or the like. The rectangular box or the circular box displays the distance information and the name of the target object. The display shape of the label is not limited in this application.

In some embodiments, after identifying the object included in the real-scenario image, the electronic device may further calculate, based on the position information of the electronic device and the coordinates of the points of interest corresponding to the target objects, orientation angles that is relative to the electronic device and that is of the target objects in space. In this way, the label that is of the target object and that is finally generated by the electronic device may include the name of the target object, and include the orientation angle. A three-dimensional space includes orientation angles of dimensions such as east, south, west, north, up, and down. A plane space includes orientation angles of dimensions such as east, south, west, and north.

Figure 7:
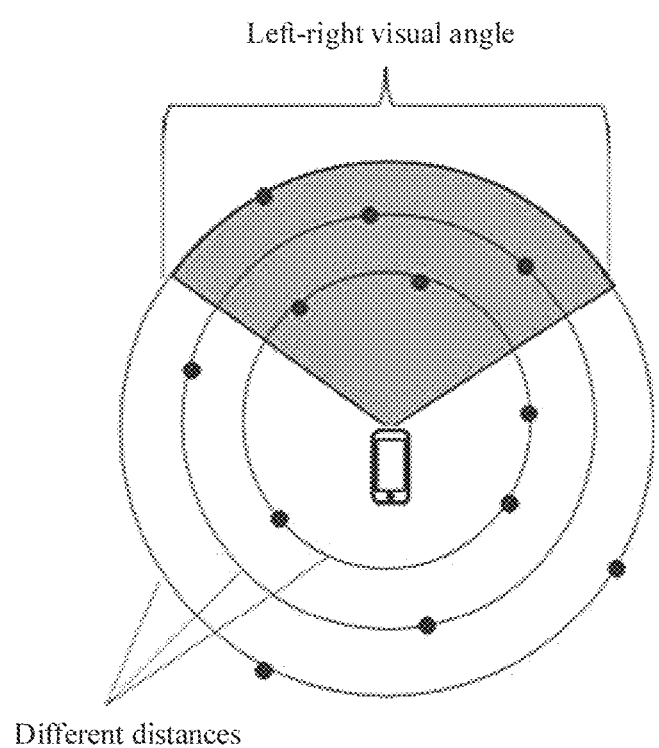
FIG. 7 is a schematic diagram of a space position relationship according to an embodiment of this application.

As shown in FIG. 7, for the plane space, a left-right visual angle of the camera of the electronic device is generally about 90 degrees, and objects within a range of the left-right visual angle may be in different orientations of the electronic device, for example, left front, right front, or straight front. Therefore, the label of the library generated by the electronic device may be: library, in a southwest direction of the electronic device.

As shown in FIG. 8, for the three-dimensional space, when the electronic device is located at a sphere center position, an up-down visual angle and a left-right visual angle each are generally about 90 degrees. There are six dimensions in a space position: south, east, west, north, up, and down. Objects at different levels may exist at different heights in a range of the up-down visual angle, for example, in FIG. 8, there are three floors: a floor 1, a floor 2, and a basement floor 1. If the electronic device is currently in a shopping mall, the store label generated by the electronic device may be: KFC, on the south side of the floor 2.

It should be noted that, in this embodiment of this application, when identifying the object in the real-scenario image, the electronic device mainly extracts a feature of the object in the real-scenario image. For example, in an outdoor scenario, typical features extracted by the electronic device include a wall, a road, sky, and a building outline, and the like. In an indoor scenario, typical features extracted by the electronic device include a ceiling, ground, a road, a staircase, floor spacing, a shop wall, and the like. In this embodiment of this application, a building name or a store name in the real-scenario image does not need to be identified. For example, the electronic device only needs to identify building outlines of the teaching building, the library, and the canteen, and does not need to identify a building name of the library and a building name of the teaching building. A reason why the electronic device does not determine information such as the building name or the store name through image identification is that if text recognition is performed on the real-scenario image on the electronic device side, the electronic device needs to perform a large quantity of calculations. This relatively consumes computing resources. If the text recognition is performed on the real-scenario image on a cloud server side, the electronic device also needs to upload the real-scenario image to the cloud server. This consumes data traffic, causes a network delay due to interaction transmission between the electronic device and the cloud server, and results in poor user experience.

In other words, the electronic device identifies only the typical feature in the real-scenario image, and generates a label of each object in the real-scenario image based on information about a point of interest obtained from an application server. Further, the electronic device determines a display position of the label of each object in the real-scenario image.

In some embodiments, because the real-scenario image obtained through collection is a two-dimensional plane image, a coordinate system corresponding to the two-dimensional plane image is a plane coordinate system, and a unit may be in a unit of meter. However, a coordinate system corresponding to the electronic map is an ellipsoid coordinate system, and a unit is longitude and latitude. When calculating the display position of the label, the electronic device needs to convert longitude and latitude coordinates of the information about the point of interest into plane coordinates of the plane coordinate system. In the prior art, there are a plurality of tools for converting between longitude and latitude coordinates and plane coordinates. For example, an arcgis tool may be used to implement the conversion between the longitude and latitude coordinates and the plane coordinates.

It should be noted that a basic principle of the conversion between the latitude and longitude coordinates and the plane coordinates by the electronic device is as follows: The electronic device uses, based on position information of the electronic device and coordinate information in the label, coordinates on a display screen of the electronic device as a projection origin, and then obtains coordinates of a center point of the label of the target object at the display position of the electronic device, to be specific, a horizontal coordinate of the center point and a vertical coordinate of the center point through calculation according to a projection formula and based on a direction angle and a tilt angle of the electronic device, a width and a height of the display screen of the electronic device, a viewfinder angle of the camera, a camera-related offset, and the like.

Figure 8A:
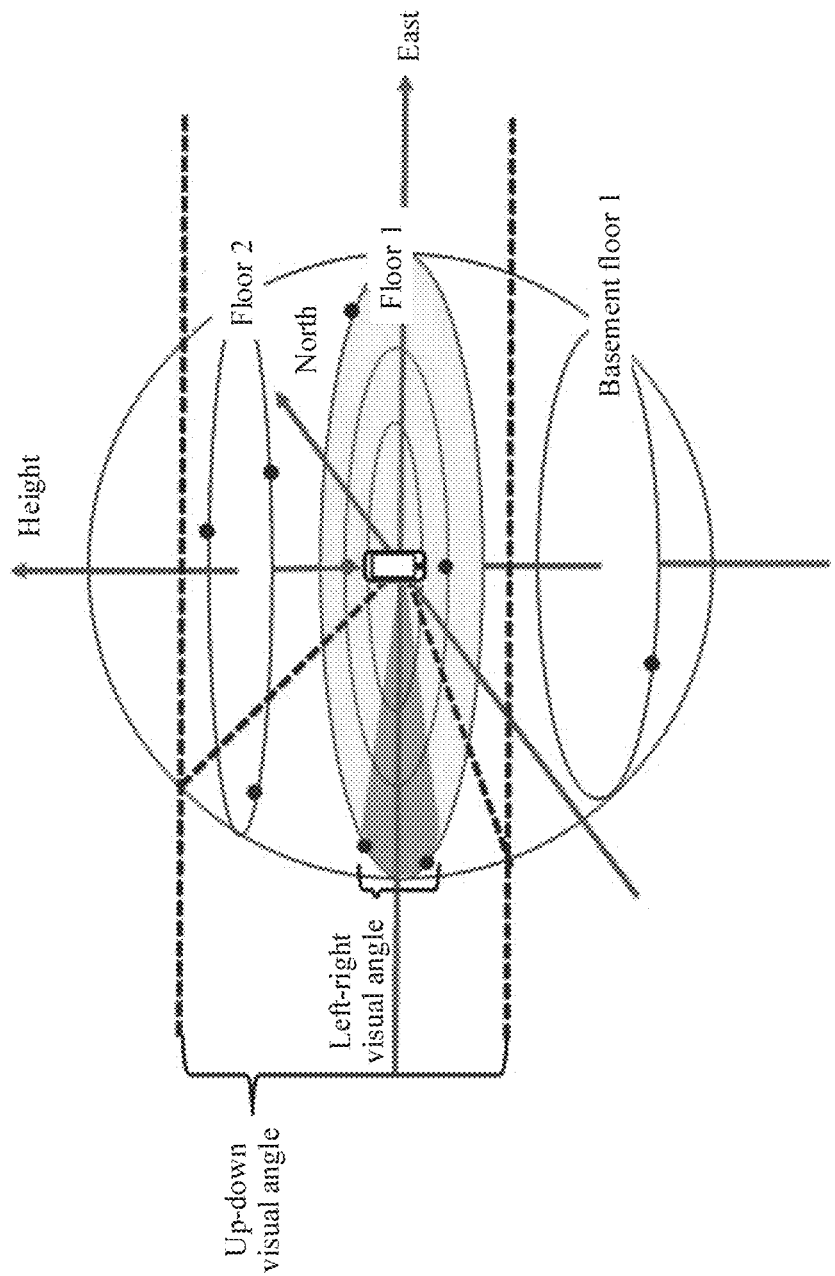
FIG. 8a is a schematic diagram of a three-dimensional space position relationship according to an embodiment of this application.
Figure 8B:
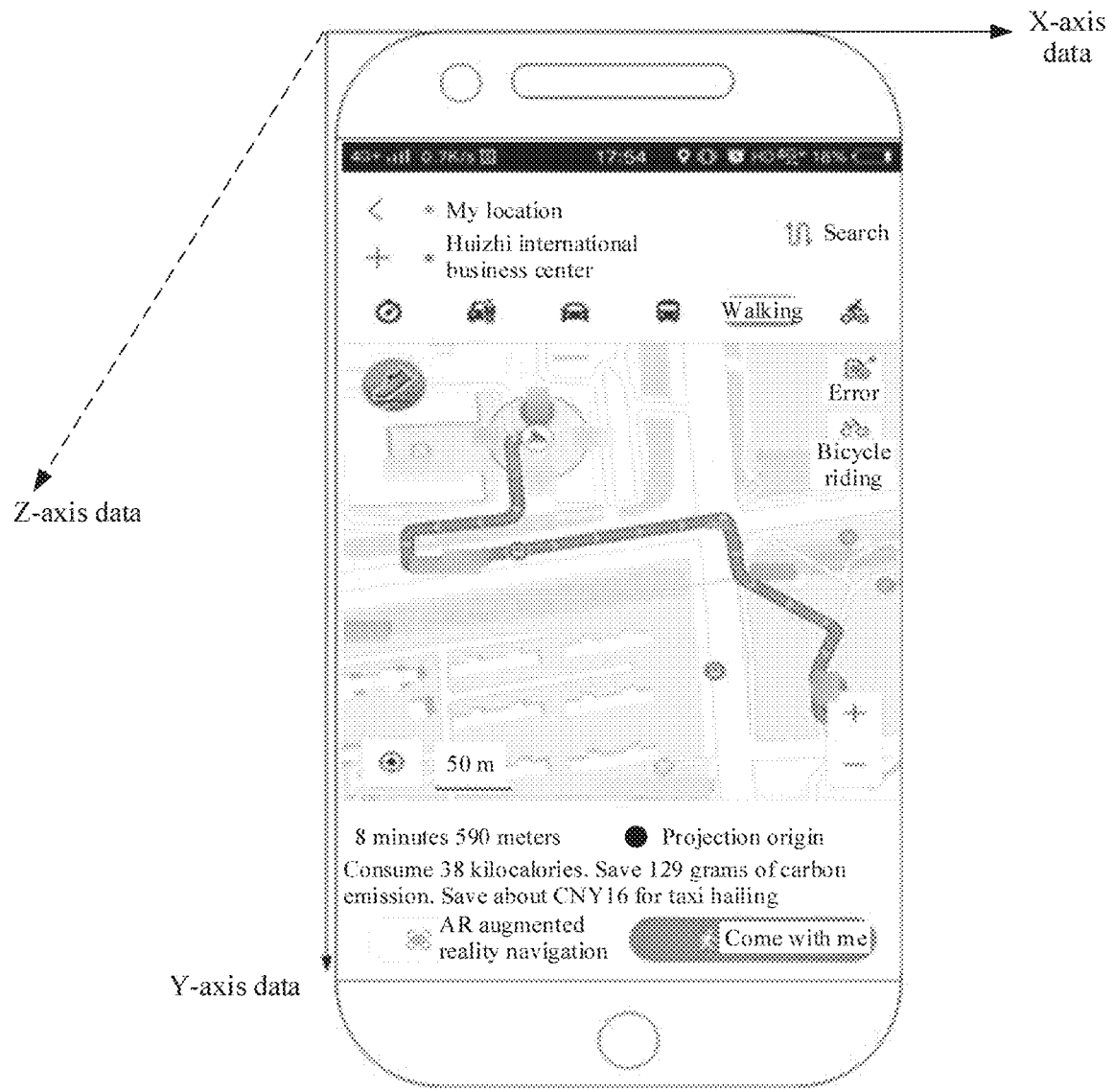
FIG. 8b is a schematic diagram of a display screen coordinate system according to an embodiment of this application.

Generally, referring to FIG. 8b, a definition manner of a coordinate system of a display screen of an electronic device is as follows: When the screen is in portrait orientation, an upper left corner is an origin, coordinates are (0, 0), coordinates from the origin to the right are positive coordinates, coordinates from the origin to the bottom are positive coordinates, the coordinates are perpendicular to the display screen, and a shooting direction of a camera is a positive direction. Therefore, when the display screen is switched to a landscape orientation, a horizontal direction may be considered as an X-axis, an up-down direction may be considered as a Y-axis, and an axis perpendicular to an XY plane may be considered as a Z-axis. A horizontal coordinate of a projection origin is a coordinate of a central point of the X-axis of the display screen, and a vertical coordinate is a lower coordinate of the Y-axis of the display screen. The coordinate information of the projection origin is predefined data.

Figure 8C:
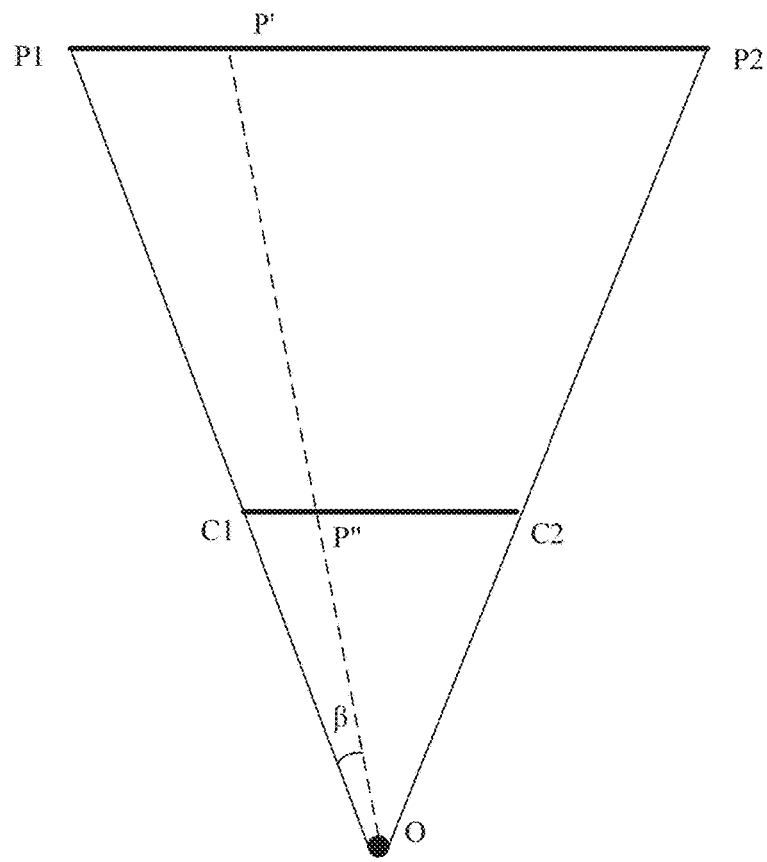
FIG. 8c and FIG. 8d are schematic diagrams of projection of horizontal and vertical coordinates of a label according to an embodiment of this application.
Figure 8D:
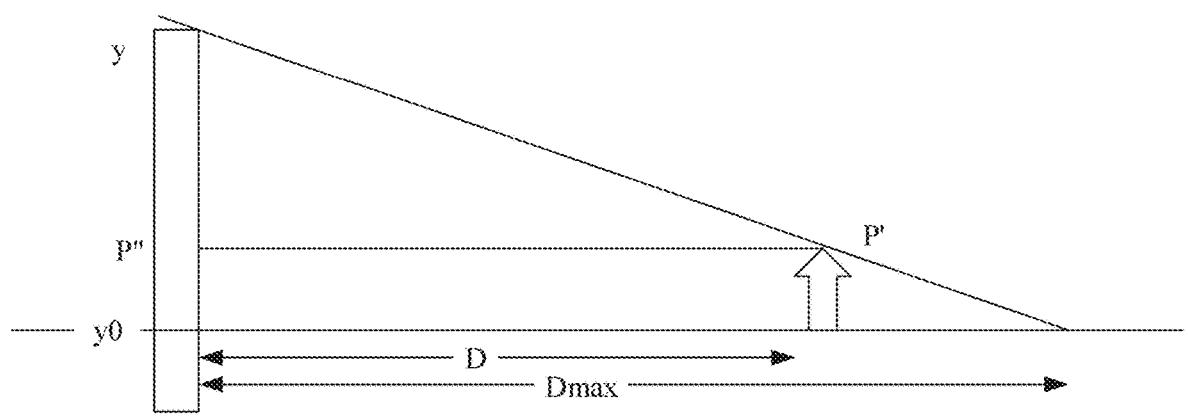

With reference to FIG. 8c, the horizontal coordinate of the center point is calculated as follows: When the screen is in portrait orientation, coordinates X of an upper left corner and an upper right corner of a display screen of an electronic device are known, and a viewfinder angle α of a camera is known. If the viewfinder angle α is 60 degrees, an included angle formed by a target object P', a focus O, and a P1 in an upper left corner of a framing range of the camera is a direction angle between the target object and the electronic device. The electronic device may obtain, through calculation based on the foregoing parameters, a horizontal coordinate of a projection point p" of the target object P' on the display screen. Refer to a formula 1.

$$p''_X = \frac{\beta}{\alpha} \times (C_{2x} - C_{1x}) + C_{1x} \qquad \text{formula [1]}$$

$p''_x$ is the horizontal coordinate of the projection point p" of the target object P' on the display screen, $\beta$ is the direction angle, $\alpha$ is the viewfinder angle of the camera, $C_{1x}$ is the coordinate X of the upper left corner of the display screen of the electronic device, and $C_{2x}$ is the coordinate X of the upper right corner of the display screen of the electronic device.

The vertical coordinate of the center point is calculated as follows: When the screen is in portrait orientation, a vertical coordinate y of the upper left corner of the display screen of the electronic device and the vertical coordinate y0 of the projection origin are known, and a distance D between the target object and the electronic device may be calculated based on the coordinates of the label and the position information of the electronic device. In addition, a longest distance Dmax that can be photographed by the electronic device is known. Therefore, a vertical coordinate of the projected point p" of the target object on the display screen may be calculated. Refer to a formula 2.

$$p''_y = y_0 - \frac{D}{D_{max}} \times (y_0 - y)$$

$p''_y$ is the vertical coordinate of the projection point p" of the target object P' on the display screen. D is a distance between the target object and the mobile terminal. $D_{max}$ is a longest photographing distance of the mobile terminal. y is a coordinate y of the upper left corner of the display screen of the electronic device. $y_0$ is a vertical coordinate of the projection origin of the electronic device.

In addition, the electronic device may further tilt forward or backward during photographing. Therefore, a tilt angle of the display screen and the like may be further considered when the vertical coordinate is calculated.

Optionally, the electronic device may further reversely estimate a distance between the projection origin and a current position of the electronic device based on the vertical coordinate of the projection origin, and then adjust, based on the distance, a distance between coordinates in the label of the target object and coordinates corresponding to the position of the electronic device, to obtain an optimized vertical coordinate of the central point.

Figure 9:
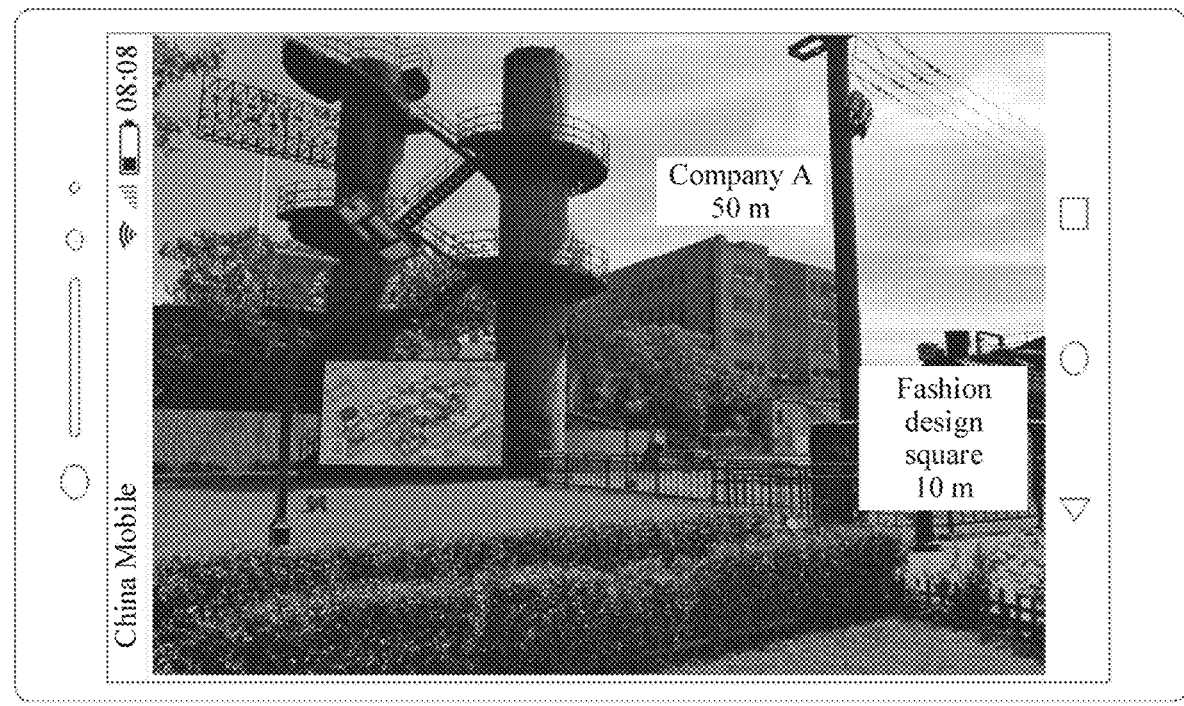
FIG. 9 is a schematic diagram of an interface of an outdoor scenario according to the prior art.
Figure 10:
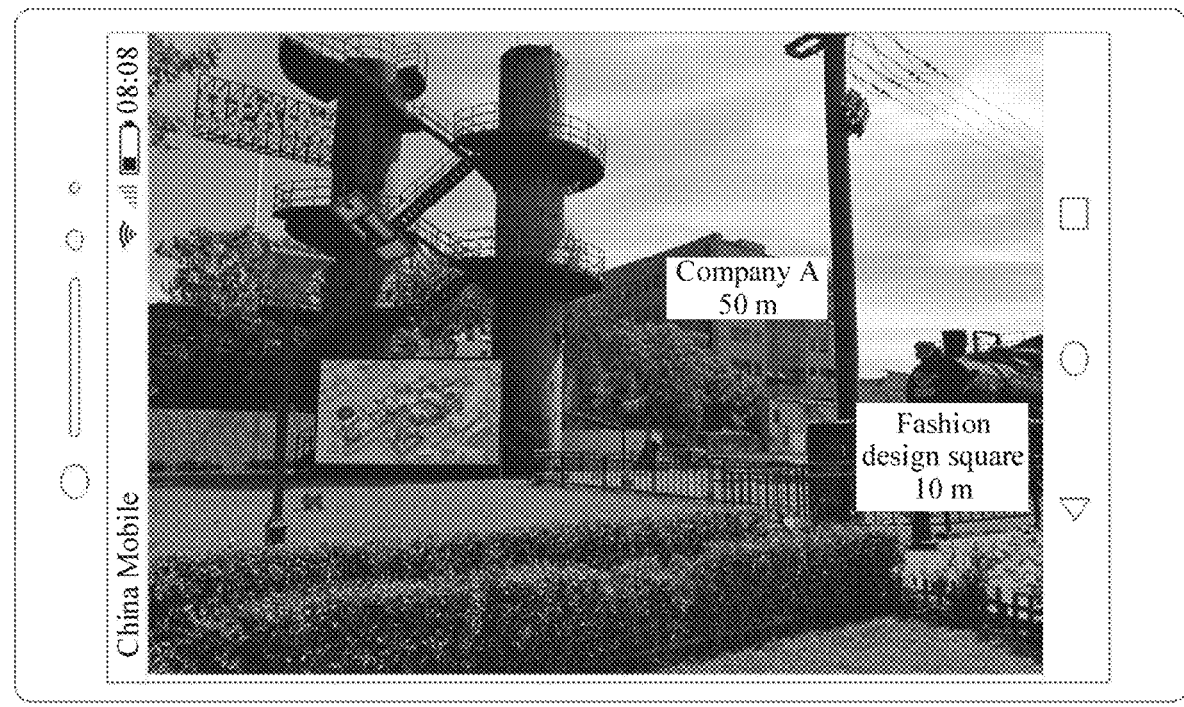
FIG. 10 is a schematic diagram of an interface of an outdoor scenario according to an embodiment of this application.

The display position that is of the label of the target object and that is obtained by the electronic device through calculation according to the foregoing method may still be unreasonable. For example, as shown in FIG. 9, in the prior art, a label of a company A in a real-scenario image photographed by a mobile phone is displayed in the sky, and the display position of the label is greatly deviated from the target object identified by the label. This is inconvenient for the user to search for the target object. To resolve this problem, in this application, the coordinates of the central point obtained through calculation according to the foregoing calculation method are further adjusted based on an identification result of the real-scenario image. Specifically, for a real-scenario image photographed by the electronic device in an outdoor scenario, the electronic device determines, by identifying typical features such as an outdoor road, ground, and sky, whether the coordinates of the center point are in an area in which these typical features are located. If the coordinates of the center point are not in the area in which these typical features are located, the electronic device adjusts the coordinates of the center point based on an area in which the building of the company A is located, and adjusts the label of the target object to a relatively reasonable height position. For example, as shown in FIG. 10, the label of the company A is adjusted to an external wall of the building of the company A.

For another example, for a real-scenario image photographed by the electronic device in an indoor scenario, the electronic device obtains a position of an indoor vertical plane (for example, a wall or a shelf) by identifying typical features such as an indoor road, a ceiling, a wall, and floor spacing, and then determines whether the coordinates of the center point are in the indoor vertical plane. If the coordinates of the center point are in the indoor vertical plane, the electronic device does not adjust the coordinates of the center point. If the coordinates of the center point are not in the indoor vertical plane, the electronic needs to adjust the coordinates of the center point, to be specific, the electronic needs to move the coordinates of the center point to the vertical plane. Generally, the electronic device adjusts the coordinates of the central point according to a preset rule, and generally adjusts the coordinates to an upper-middle position of a wall of the target object. For example, a store name is generally displayed at ⅔ or ¾ of an outer wall of a store, and a commodity is generally displayed on a shelf Therefore, the electronic device first estimates a display height of the display position of the label of the target object on the vertical plane. Then, based on the estimated display height and a maximum limit of the label of the target object, the electronic device adjusts the label of the target object to a relatively reasonable height position on the vertical plane.

In the foregoing manner, it can be learned that in this embodiment of this application, the label of the target object can be accurately displayed in the real-scenario image through coarse-grained scenario identification and based on the information about the point of interest obtained from the electronic map. In this way, a calculation amount of the electronic device is reduced while an augmented reality navigation function is implemented.

In this embodiment of this application, the electronic device may obtain the position information of the electronic device through positioning. Therefore, the electronic device may further determine, based on the position information of the electronic device, whether the electronic device is currently in the indoor scenario or the outdoor scenario. In addition to extracting different features of objects in the real-scenario image according to different scenarios, the electronic device may further extract a corresponding feature of the object in the current real-scenario image in real time when the position of the electronic device is switched from the outdoor scenario to the indoor scenario. Alternatively, when the position of the electronic device is switched from the indoor scenario to the outdoor scenario, the electronic device may further extract a corresponding feature of the object in the current real-scenario image in real time.

For example, when the electronic device determines, through positioning, that the position of the electronic device is in the outdoor scenario, the typical features currently extracted by the electronic device from the real-scenario image include a wall, a road, sky, a building outline, and the like. When the position of the electronic device is switched to the indoor scenario, the typical features currently extracted by the electronic device from the real-scenario image include a ceiling, a floor, a road, a staircase, floor spacing, a store wall, and the like.

For example, when the electronic device currently performs walking navigation outdoors, the electronic device may determine, by using information such as a GPS or a Wi-Fi hotspot, that a current position of the electronic device is in the outdoor scenario. When the electronic device performs image identification on the real-scenario image collected by the camera, the extracted typical features include a wall, a road, sky, a building outline, and the like. As shown in FIG. 10, objects identified by the mobile electronic device include a building, a grassland, a road, a square, and the like. Then, the electronic device obtains information about a point of interest in an electronic map based on the current position of the electronic device, to generate the label of the building of the company A and a label of a fashion design square, and displays the labels in corresponding positions of the image. It can be learned that when the electronic device is located in the outdoor scenario, the label in the image is relatively loose.

Further, the electronic device automatically switches a display style of the label from an outdoor label display style to an indoor label display style when the electronic device determines, based on a positioning result of the electronic device, that the electronic device moves from an outdoor position to an indoor position. Alternatively, the electronic device automatically switches a display style of the label from an indoor label display style to an outdoor label display style when the electronic device determines, based on a positioning result of the electronic device, that the electronic device moves from an indoor position to an outdoor position. The outdoor label display style includes any one or any combination of the following: that content of the label includes a name of the target object and a distance between the target object and the electronic device, and that labels are loosely arranged in the real-scenario image and are irregularly arranged. The indoor label display style includes any one or any combination of the following: that content of the label includes a name of the target object, a distance between the target object and the electronic device, and a floor on which the target object is located, and that labels are compactly arranged in the real-scenario image and are arranged based on a floor on which the target object is located.

Figure 11:
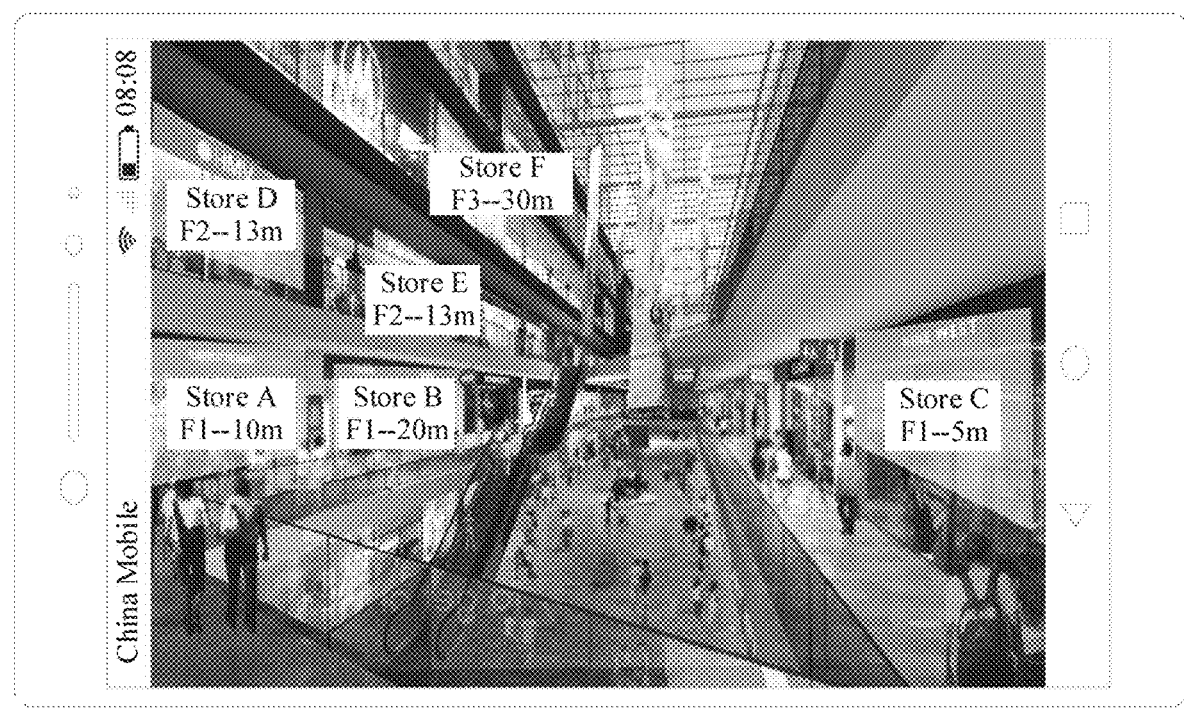
FIG. 11 is a schematic diagram of an interface of an indoor scenario according to an embodiment of this application.

For example, when the electronic device moves into a shopping mall from an outdoor position through walking navigation, the typical features currently extracted by the electronic device from the real-scenario image include a ceiling, ground, a road, a staircase, floor spacing, a shop wall, and the like. As shown in FIG. 11, objects identified by the electronic device have a ceiling, ground, a road, a staircase, floor spacing, a store wall, and the like. Then, the electronic device obtains information about each store in an electronic map based on a current position of the electronic device, to generate a label of each store, where in addition to a store name and a distance, the label further includes floor information. For example, if the label includes a store A, F1—10 m, the store name is store A, which is on a floor 1 and 10 m away from a user. The electronic device displays the label on the store wall in a form of a rectangular frame. It can be learned that, when the electronic device is located in an indoor scenario, compared with that in an outdoor scenario, a quantity of labels increases, the labels are arranged based on floors, and the labels include floor information.

Figure 12A:
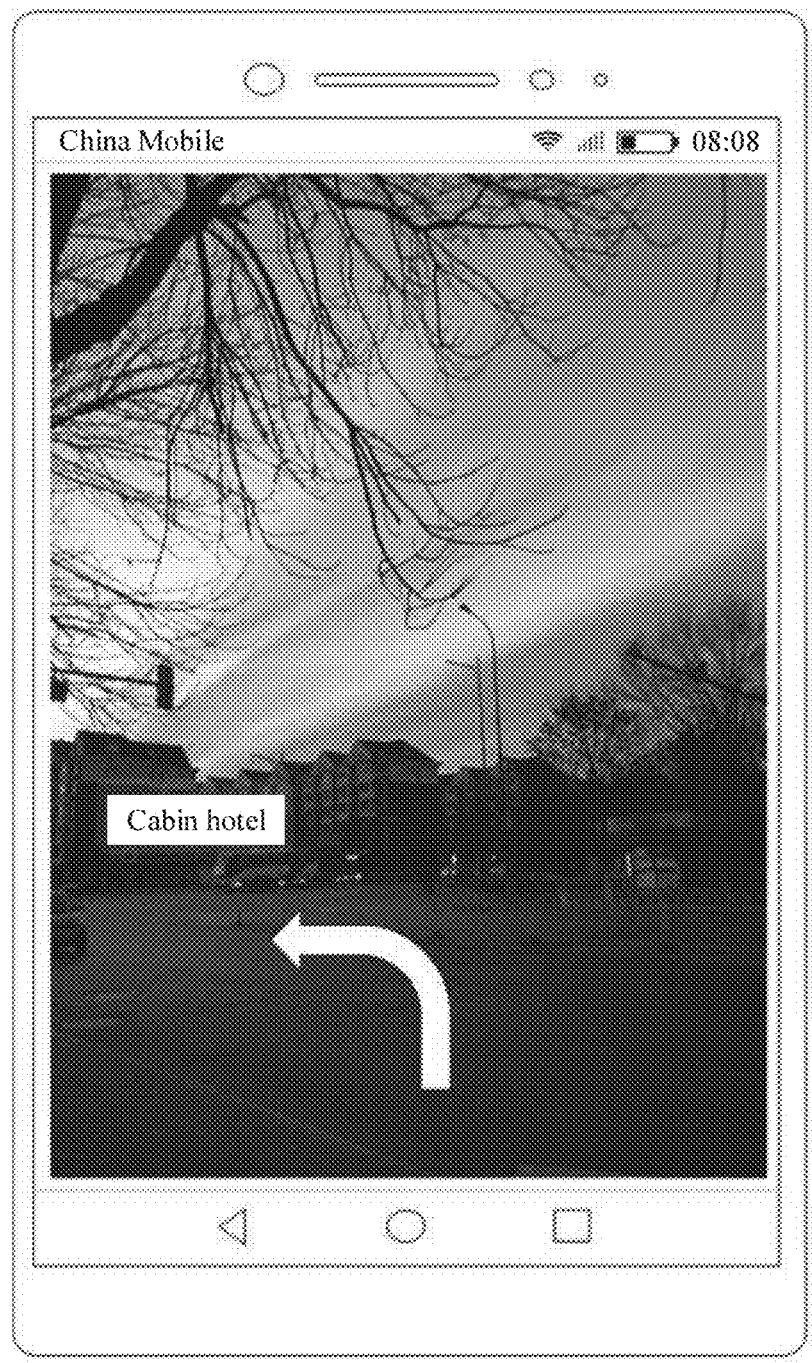
FIG. 12a and FIG. 12b are schematic diagrams of an interface of another outdoor scenario according to an embodiment of this application.
Figure 12B:
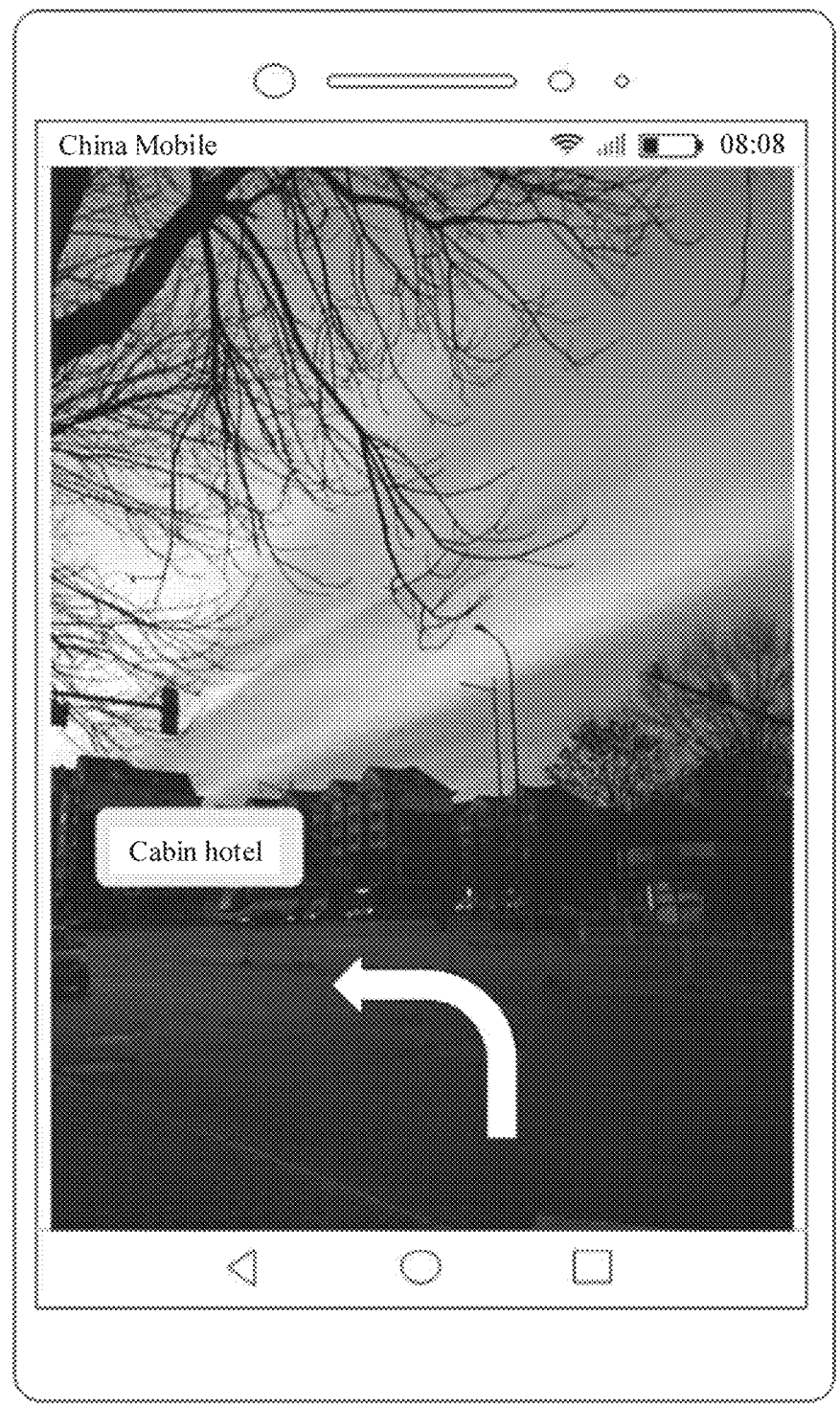

In addition, when the electronic device is in a moving process or in different time periods, a problem that a label is not clearly displayed may occur in the real-scenario image photographed by the mobile phone because of a change of a background environment of the image. For example, FIG. 12*a* shows an effect of superposing and displaying a label and a real-scenario image when light in the afternoon is insufficient in the prior art. It can be seen from FIG. 12*a* that, a label of a cabin hotel is not easily distinguished by a user. Therefore, according to the information prompt method provided in this embodiment of this application, a display parameter of the generated label may be further adjusted based on information collected by an ambient optical sensor, for example, font transparency, a font color, and background transparency of the label that are in the label are adjusted, so that content displayed on the label is clearer. For example, as shown in FIG. 12*b*, when the mobile electronic device photographs a real-scenario image of a cabin, the ambient optical sensor detects that current light is insufficient. Therefore, the electronic device reduces transparency of a background of the label of the cabin hotel, so that the electronic device can more clearly obtain label content.

In addition, when the label is unclear after the label and the real-scenario image are displayed in an overlay mode, the electronic device may also adjust the background color in the real-scenario image, so that the electronic device can more clearly obtain the label content.

It should be noted that the information prompt method provided in this embodiment of this application is applicable to a walking navigation scenario, and applicable to a scenario such as cycling or driving. In addition, during navigation, when the electronic device displays a virtual reality image formed by superposing and displaying the label and the real-scenario image, the mobile phone may broadcast labels of objects in directions such as the left, the right, left front, and right front of the electronic device in real time. For example, in an outdoor navigation process, voice prompt information output by the mobile phone may be as follows: a kindergarten is 500 meters away on the left, a fountain square is 100 meters away on the right, and a stationery store is 50 meters away in front. Alternatively, in an indoor navigation process, voice prompt information output by the mobile phone may be that: there is a women's clothing store Ayilian which is 10 meters in front of the left side of a floor 1, and there is a women's clothing store ONLY which is 20 meters in front of the right side of the floor 1. A voice language displayed by the mobile phone may also be English, Mandarin, Cantonese, or the like, in other words, the mobile phone performs broadcasting based on a language set on the electronic device.

It can be learned that in this embodiment of this application, the electronic device performs, based on information about a point of interest in an electronic map, text recognition on the object in the real-scenario image collected by the electronic device, to generate the label. In addition, the electronic device may calculate a display position of a label of each object in the image based on coordinate information in the information about the point of interest and the position information of the electronic device, and then superpose and display the label and the real-scenario image. In this way, a calculation workload of the electronic device can be reduced, and power consumption can be reduced. In addition, content of the label may change according to an indoor/outdoor scenario, and the background transparency of the label and the font of the label may also be adjusted based on a light intensity in a real scenario. This improves definition of the label in the virtual reality image formed by superposing and displaying the label and the real-scenario image.

An embodiment of this application further provides a computer-readable storage medium. The computer-readable storage medium includes a computer program, and when the computer program runs on an electronic device, the electronic device is enabled to perform any possible implementation of the foregoing communication method.

An embodiment of this application further provides a computer program product. When the computer program product runs on an electronic device, the electronic device is enabled to perform any possible implementation of the foregoing communication method.

Figure 13:
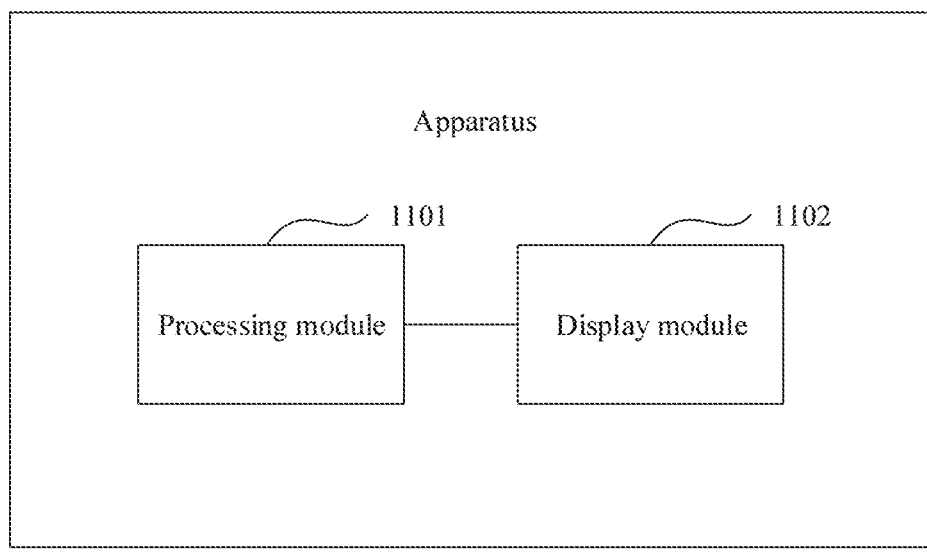
FIG. 13 is a schematic structural diagram of an apparatus according to an embodiment of this application.

In some embodiments of this application, an embodiment of this application discloses an apparatus. As shown in FIG. 13, the apparatus is configured to implement the methods recorded in the foregoing method embodiments, and includes a processing module 1101 and a display module 1102. The processing module 1101 is configured to support the electronic device in performing the steps 201 to 205 in FIG. 4. The processing module 1101 is further configured to support the electronic device in performing superimposition of the label and the real-scenario image based on the display position in FIG. 4. The display module 1002 is configured to support the electronic device in performing the step 206 in FIG. 4. The display module 1102 in FIG. 13 may be implemented by using the display screen 194, and the processing module 1101 may be implemented by using the processor 110. The apparatus may be implemented at an application framework layer of an Android operating system, and the application framework layer may provide an interface for invoking by an application such as a map. All related content of the steps in the foregoing method embodiments may be cited in function descriptions of corresponding function modules. Details are not described herein.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a flash memory, a hard disk, a read-only memory, a random access memory, a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. An information prompt method, implemented by an electronic device, wherein the information prompt method comprises:
    when the electronic device runs an augmented reality navigation function, collecting an image of a first ambient environment of a user to generate a real-scenario image and obtaining first information about a first point of interest from an electronic map;
    identifying the real-scenario image to determine a target object;
    determining a label of the target object and a display position of the label in the real-scenario image based on the first information and position information of the electronic device; and
    displaying an interface comprising the label and the real-scenario image, wherein the label is displayed in an overlay mode at the display position.

2. The information prompt method of claim 1, further comprising:
    obtaining second information about a second point of interest in a specified area from the electronic map based on a shooting direction of the electronic device and the position information, wherein the specified area comprises the position information, and wherein the second information comprises a first name of the second point of interest and first coordinates of the second point of interest;
    determining a first relative position relationship between the target object in the real-scenario image and the electronic device;
    determining a second relative position relationship between the second point of interest and the user based on the first coordinates and the position information;
    determining, based on the first relative position relationship and the second relative position relationship, a target point of interest matching the target object; and
    generating the label based on third information about the target point of interest, wherein the label comprises a second name of the target object.

3. The information prompt method of claim 2, further comprising:
    determining second coordinates of the target object based on third coordinates of the target point of interest;
    determining center coordinates of the label in the real-scenario image based on the second coordinates and the position information; and
    determining the display position based on the center coordinates.

4. The information prompt method of claim 1, wherein the display position is at a middle-to-upper position on a wall of the target object or on a shelf, and wherein the display position is not in a display area of any one of a sky, a ceiling, a road, a ground, a staircase, or floor spacing.

5. The information prompt method of claim 1, further comprising:
    identifying a feature from the real-scenario image;
    determining, when the electronic device is located outdoors, that the feature comprises any one of a wall, a first road, a sky, or a building outline, or determining, when the electronic device is located indoors, that the feature comprises any one of a ceiling, a ground, a second road, a staircase, floor spacing, or a store wall; and
    determining the target object based on the feature.

6. The information prompt method of claim 1, further comprising:
    determining, based on fourth information from an ambient optical sensor of the electronic device, that luminance of a second ambient environment of the electronic device changes; and
    adjusting a display parameter of the label based on the fourth information, wherein the display parameter comprises any one of a font color or a background transparency.

7. The information prompt method of claim 1, further comprising:
    determining that background luminance of the real-scenario image changes; and
    adjusting a display parameter of the label based on the background luminance, wherein the display parameter comprises any one of a font color or a background transparency.

8. The information prompt method of claim 1, further comprising calculating an orientation that is relative to the electronic device and that is of the target object, wherein the label comprises the orientation.

9. An electronic device, comprising:
    a processor; and
    a memory coupled to the processor and configured to store instructions that, when executed by the processor, cause the electronic device to be configured to:
        collect an image of a first ambient environment of a user to generate a real-scenario image;

obtain first information about a first point of interest from an electronic map;
identify the real-scenario image to determine a target object;
determine a label of the target object and a display position of the label in the real-scenario image based on the first information and position information of the electronic device; and
display an interface comprising the label and the real-scenario image, wherein the label is displayed in an overlay mode at the display position.

10. The electronic device of claim 9, wherein the instructions further cause the electronic device to be configured to:
obtain second information about a second point of interest in a specified area from the electronic map based on a shooting direction of the electronic device and the position information, wherein the specified area comprises the position information, and wherein the second information comprises a first name of the second point of interest and first coordinates of the second point of interest;
determine a first relative position relationship between the target object in the real-scenario image and the electronic device;
determine a second relative position relationship between the second point of interest and the user based on the first coordinates and the position information;
determine, based on the first relative position relationship and the second relative position relationship, a target point of interest matching the target object; and
generate the label based on third information about the target point of interest, wherein the label comprises a second name of the target object.

11. The electronic device of claim 10, wherein instructions further cause the electronic device to be configured to:
determine second coordinates of the target object based on third coordinates of the target point of interest;
determine center coordinates of the label in the real-scenario image based on the second coordinates and the position information; and
determine the display position based on the center coordinates.

12. The electronic device of claim 10, wherein the processor is further configured to calculate an orientation that is relative to the electronic device and that is of the target object, and wherein the label comprises the orientation.

13. The electronic device of claim 9, wherein the display position is at a middle-to-upper position on a wall of the target object or on a shelf, and wherein the display position is not in a display area of any one of a sky, a ceiling, a road, a ground, a staircase, or floor spacing.

14. The electronic device of claim 9, wherein the instructions further cause the electronic device to be configured to:
identify a feature from the real-scenario image;
determine, when the electronic device is located outdoors, that the feature comprises any one of a wall, a first road, a sky, or a building outline, or determine, when the electronic device is located indoors, that the feature comprises any one of a ceiling, a ground, a second road, a staircase, floor spacing, or a store wall; and
determine the target object based on the feature.

15. The electronic device of claim 9, wherein the electronic device further comprises an ambient optical sensor coupled to the processor, and wherein the instructions further cause the electronic device to be configured to:
determine, based on fourth information from the ambient optical sensor, that luminance of a second ambient environment of the electronic device changes; and
adjust a display parameter of the label based on the fourth information, wherein the display parameter comprises any one of a font color or a background transparency.

16. The electronic device of claim 9, wherein the instructions further cause the electronic device to be configured to:
determine that background luminance of the real-scenario image changes; and
adjust a display parameter of the label based on the background luminance, wherein the display parameter comprises any one of a font color or a background transparency.

17. A computer program product comprising computer-executable instructions stored on a non-transitory computer-readable medium that, when executed by a processor, cause an apparatus to:
collect an image of a first ambient environment of a user to generate a real-scenario image;
obtain first information about a first point of interest from an electronic map;
identify the real-scenario image, to determine a target object;
determine a label of the target object and a display position of the label in the real-scenario image based on the first information and position information of an electronic device; and
display an interface comprising the label and the real-scenario image, wherein the label is displayed in an overlay mode at the display position.

18. The computer program product of claim 17, wherein the instructions further cause the apparatus to:
obtain second information about a second point of interest in a specified area from the electronic map based on a shooting direction of the electronic device and the position information, wherein the specified area comprises the position information, and wherein the second information comprises a first name of the second point of interest and first coordinates of the second point of interest; and
determine a first relative position relationship between the target object in the real-scenario image and the electronic device;
determine a second relative position relationship between the second point of interest and the user based on the first coordinates and the position information;
determine, based on the first relative position relationship and the second relative position relationship, a target point of interest matching the target object; and
generate the label based on third information about the target point of interest, wherein the label comprises a second name of the target object.

19. The computer program product of claim 17, wherein the instructions further cause the apparatus to:
determine second coordinates of a target object based on third coordinates of the target point of interest;
determine center coordinates of the label in the real-scenario image based on the second coordinates and the position information; and
determine the display position based on the center coordinates.

20. The computer program product of claim 17, wherein the instructions further cause the apparatus to calculate an orientation that is relative to the electronic device and that is of the target object, and wherein the label comprises the orientation.

* * * * *